US010936576B2

(12) United States Patent
Patel et al.

(10) Patent No.: US 10,936,576 B2
(45) Date of Patent: Mar. 2, 2021

(54) REPLICATING STORAGE TABLES USED TO MANAGE CLOUD-BASED RESOURCES TO WITHSTAND STORAGE ACCOUNT OUTAGE

(71) Applicant: Microsoft Technology Licensing, LLC, Redmond, WA (US)

(72) Inventors: Parveen Kumar Patel, Cupertino, CA (US); Kamel Sbaia, San Jose, CA (US); Yunus Mohammed, Bellevue, WA (US); Srinath Setty, Redmond, WA (US); Jun Wang, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 913 days.

(21) Appl. No.: 15/453,293

(22) Filed: Mar. 8, 2017

(65) Prior Publication Data
US 2018/0260428 A1    Sep. 13, 2018

(51) Int. Cl.
*G06F 16/23*    (2019.01)
*G06F 16/27*    (2019.01)
(Continued)

(52) U.S. Cl.
CPC ...... *G06F 16/2329* (2019.01); *G06F 9/45558* (2013.01); *G06F 11/2094* (2013.01);
(Continued)

(58) Field of Classification Search
CPC .... G06F 16/278; G06F 16/27; G06F 11/2094; G06F 16/2365; G06F 16/252;
(Continued)

(56) References Cited

U.S. PATENT DOCUMENTS 5,559,764 A    9/1996 Chen et al.
7,653,668 B1    1/2010 Shelat et al.
(Continued)

FOREIGN PATENT DOCUMENTS

WO    2016200712 A1    12/2016

OTHER PUBLICATIONS

Chinese Application No. 201610864594.X filed Sep. 29, 2016. English Tranlsation attached.
(Continued)

*Primary Examiner* — Yuk Ting Choi
(74) *Attorney, Agent, or Firm* — Ray Quinney & Nebeker P.C; James Bullough

(57) ABSTRACT

A storage account is replicated across multiple data centers so as to withstand an outage of the storage account. A front end and applications use data stored in the storage accounts to manage resources of a cloud computing system. A client includes an interface used by the front end to access the storage accounts, in addition to an interface that is used by the applications to access the storage accounts. Other features, which ensure that a read operation survives even if a head replica or a tail replica is down, include reading from a head replica instead of from a tail replica, a two phase prepare-commit operation to propagate changes from head to tail replicas, and provisioning a back end repair service if a failure occurs in the middle of the prepare-commit operation.

17 Claims, 17 Drawing Sheets

(51) Int. Cl.
*G06F 16/248* (2019.01)
*G06F 16/25* (2019.01)
*G06F 11/20* (2006.01)
*G06F 9/455* (2018.01)

(52) U.S. Cl.
CPC ...... *G06F 11/2097* (2013.01); *G06F 16/2365* (2019.01); *G06F 16/248* (2019.01); *G06F 16/252* (2019.01); *G06F 16/27* (2019.01); *G06F 2201/82* (2013.01)

(58) Field of Classification Search
CPC ...... G06F 3/067; G06F 16/22; G06F 11/2023; G06F 9/5016; G06F 9/526; G06F 16/2343; G06F 16/23; G06F 16/248; G06F 16/25; G06F 11/20; G06F 9/455; G06F 11/3632; G06F 11/2069; G06F 16/1774
See application file for complete search history.

(56) References Cited

U.S. PATENT DOCUMENTS

| | | | |
|---|---|---|---|
| 8,055,615 B2 | 11/2011 | Roberts et al. | |
| 8,874,726 B1 | 10/2014 | Dugganapally et al. | |
| 8,972,365 B2 | 3/2015 | Ozawa et al. | |
| 9,002,939 B2 | 4/2015 | Laden et al. | |
| 9,053,167 B1* | 6/2015 | Swift | G06F 16/27 707/999.003 |
| 9,116,862 B1 | 8/2015 | Rath et al. | |
| 9,323,775 B2 | 4/2016 | Srivas et al. | |
| 10,019,323 B1* | 7/2018 | Bai | G06F 11/1004 707/999.003 |
| 2004/0122871 A1* | 6/2004 | Hansen | G06F 16/93 707/999.204 |
| 2009/0006489 A1 | 1/2009 | Ramasubramanian et al. | |
| 2011/0055494 A1 | 3/2011 | Roberts et al. | |
| 2013/0067469 A1 | 3/2013 | Das et al. | |
| 2013/0205303 A1* | 8/2013 | Ganai | G06F 9/524 718/106 |
| 2013/0325950 A1* | 12/2013 | Laden | H04L 67/1095 709/204 |
| 2016/0378713 A1 | 12/2016 | Kaimalettu et al. | |
| 2017/0032012 A1* | 2/2017 | Zhang | G06F 16/275 707/999.003 |

OTHER PUBLICATIONS

Cidon, et al., "Tiered Replication: A Cost-effective Alternative to Full Cluster Geo-replication", In Proceedings of the 2015 Usenix Conference on Usenix Annual Technical Conference, Jul. 8, 2015, pp. 31-43.
Dahliamalkhi, "CR: Chain Replication", https://github.com/CorfuDB/CorfuDB/wiki/Chain-Replication, Published on: Aug. 28, 2015, 1 pages.
Escriva, et al., "Copysets and Chainsets: A Better Way to Replicate", http://hackingdistributed.com/2014/02/14/chainsets/, Published on: Feb. 14, 2014, 7 pages.
Escriva, et al., "HyperDex: A Distributed, Searchable Key-Value Store", In Proceedings of the ACM SIGCOMM Conference on Applications, technologies, architectures, and protocols for computer communication, Aug. 13, 2012, 12 pages.
Fritchie, Scott Lystig, "Chain Replication in Theory and in Practice", In Proceedings of the 9th ACM SIGPLAN Workshop on Erlang, Sep. 30, 2010, 11 pages.
Helfer, Jonas, "Chain Replication", http://dsrg.pdos.csail.mit.edu/2013/08/08/chain-replication/, Published on: Aug. 8, 2013, 2 pages.
Nanavati, Mihir, "Consistency in Distributed Storage Systems", https://www.cs.ubc.ca/~bestchai/teaching/cs416_2015w2/lectures/lecture-mar4.pdf, Published on: Mar. 4, 2016, 60 pages.
Renesse, et al., "Chain replication for supporting high throughput and availability", In Proceedings of the 6th conference on Symposium on Opearting Systems Design & Implementation—vol. 6, Dec. 6, 2004, 14 pages.
Terrace, et al., "Object storage on CRAQ: high-throughput chain replication for read-mostly workloads", In Proceedings of USENIX Annual Technical Conference, Jun. 2009, pp. 1-16.
"International Search Report and Written Opinion Issued in PCT Application No. PCT/US2018/020346", dated Sep. 25, 2018, 17 Pages.

\* cited by examiner

FIG. 6

| Row | Data | Ver | Lock.. |
|---|---|---|---|
| 1 | d | 10 | 0 |

| Row | Data | Ver | Lock.. |
|---|---|---|---|
| 1 | d | 10 | 0 |

| Row | Data | Ver | Lock.. |
|---|---|---|---|
| 1 | d | 10 | 0 |

FIG. 7

| Row | Data | Ver | Lock.. |
|---|---|---|---|
| 1 | d' | 11 | 1 |

| Row | Data | Ver | Lock.. |
|---|---|---|---|
| 1 | d' | 11 | 1 |

| Row | Data | Ver | Lock.. |
|---|---|---|---|
| 1 | d' | 11 | 1 |

FIG. 8

| Row | Data | Ver | Lock.. |
|---|---|---|---|
| 1 | d' | 11 | 0 |

| Row | Data | Ver | Lock.. |
|---|---|---|---|
| 1 | d' | 11 | 0 |

| Row | Data | Ver | Lock.. |
|---|---|---|---|
| 1 | d' | 11 | 0 |

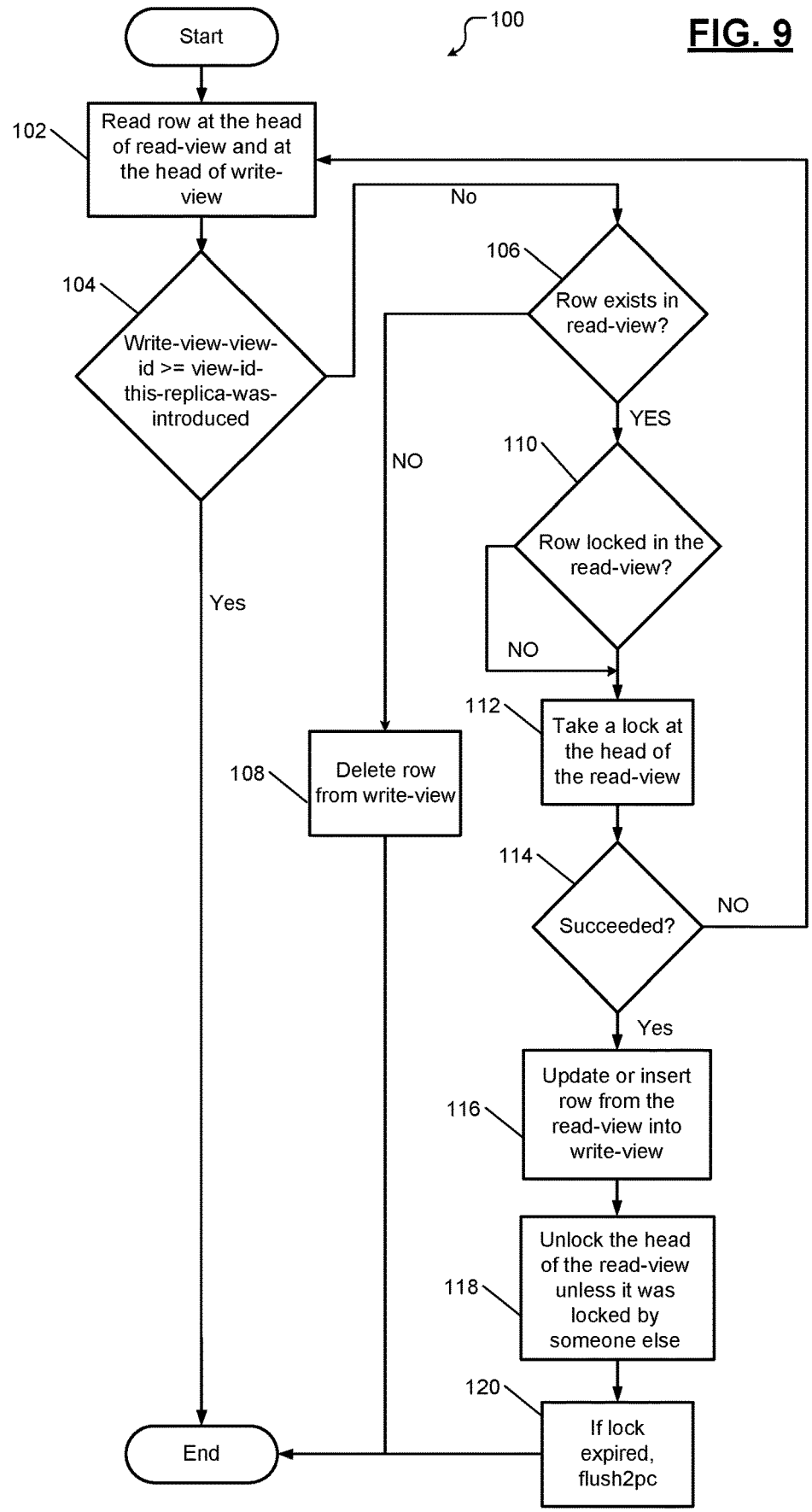

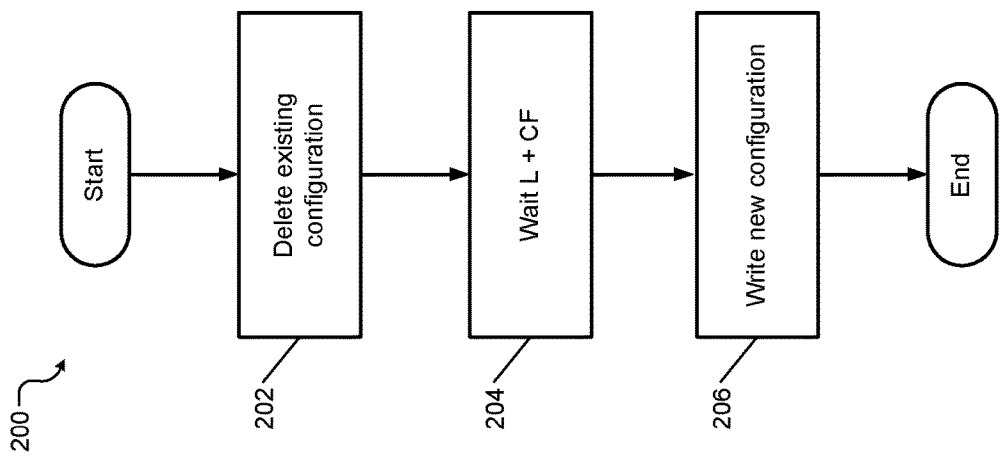
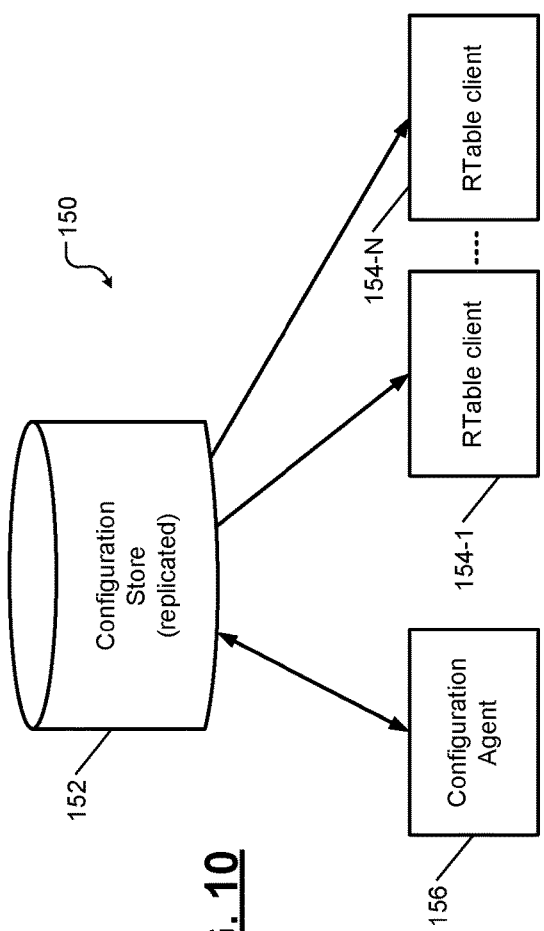
| Service Name | Replica chain | Read head index | ViewId | Lease duration | Timestamp |
|---|---|---|---|---|---|
| Express Route | GwmRTable-useast, 5; GwmRTable-uswest, 1 | 0 | 6 | 60 | 00:00:00::01 012014 (UTC) |
| Layer 7 LB | GwmRTable-asiawest, 7; GwmRTable-asiaeast, 2 | 0 | 8 | 60 | 00:00:00::01 012016 (UTC) |
FIG. 11

| Scenarios | | | | Storage operations | | |
|---|---|---|---|---|---|---|
| Head | Tail | Monitor | | Read | Write | Comments |
| Up | Up | Up/down | | Success | Success | |
| Up | Down | Up/down | | Fail | Fail. Success after take tail off. | |
| Down | Up | Up/down | | Success | Fail. Success after take tail off. | |
| Down | Down | Up/down | | Fail | Fail | |

FIG. 21

| Scenarios | | | | Storage operations | | |
|---|---|---|---|---|---|---|
| Head | Tail | Monitor | | Read | Write | Comments |
| Up | Up | Up/down | | Success | Success | |
| Up | Down | Up/down | | Success | Fail. Success after take tail off. | |
| Down | Up | Up/down | | Success | Fail. Success after take tail off. | Read will fall back to tail and cannot be used for write |
| Down | Down | Up/down | | Fail | Fail | |

REPLICATING STORAGE TABLES USED TO MANAGE CLOUD-BASED RESOURCES TO WITHSTAND STORAGE ACCOUNT OUTAGE

FIELD

The present disclosure relates generally to cloud computing systems and more particularly to replicating storage tables used to manage cloud-based resources to withstand storage account outage.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a cloud computing system, a storage account stores data used to manage resources of the cloud computing system. The data stored in the storage account allows customers to access the resources of the cloud computing system. If the storage account fails, the cloud-based services provided to the customers by the cloud computing system go down globally, and the customers cannot manage their resources in any region.

SUMMARY

A system comprises a processor and memory, and machine readable instructions stored in the memory. When executed by the processor, the machine readable instructions configure the processor to store data as entities in one or more tables. The machine readable instructions configure the processor to interface a plurality of replicas of the one or more tables to an application via a first interface. The application accesses the data from one of the plurality of replicas via the first interface. The machine readable instructions configure the processor to interface the plurality of replicas to a resource management service of a cloud computing system via a second interface. The resource management service manages resources of the cloud computing system based on the data stored in the one or more tables.

In other features, the data includes structured and non-relational data.

In other features, the machine readable instructions further configure the processor to store each replica from the plurality of replicas in a different data center to secure the data when one of the data centers fails.

In other features, the machine readable instructions further configure the processor to generate an ordered set of the plurality of replicas of the one or more tables, perform a write operation by writing sequentially from a first replica to a last replica in the ordered set, confirm success of the write operation by verifying completion of the write operation sequentially from the last replica to the first replica, and read from the first replica to prevent returning incorrect data when the write operation fails between the first and the last replicas.

In other features, the machine readable instructions further configure the processor to generate a new replica, and to add the new replica subsequent to the last replica.

In other features, the machine readable instructions further configure the processor to generate a new replica including data that is consistent with the first replica, to generate the new replica in background, and to add the new replica subsequent to the last replica.

In other features, the machine readable instructions further configure the processor to generate an ordered set of a plurality of replicas of the one or more tables, and perform a write operation by writing sequentially from a first replica to a last replica in the ordered set. When the write operation fails on one of the replicas between the first and the last replicas, the machine readable instructions further configure the processor to perform a repair operation on the one of the replica in background.

In other features, the machine readable instructions further configure the processor to perform the repair operation on the one of the replica in background by adding an event in a storage queue when the write operation fails on one of the replicas between the first and the last replicas, and by activating a repair service that performs the repair operation in the background.

In other features, the machine readable instructions further configure the processor to generate an ordered set of a plurality of replicas of the one or more tables. When a first replica in the ordered set fails, the machine readable instructions further configure the processor to remove the first replica, use a last replica in the ordered set as a new first replica, and add a new last replica.

In other features, the machine readable instructions further configure the processor to generate an ordered set of a plurality of replicas of the one or more tables. When a last replica in the ordered set fails, the machine readable instructions further configure the processor to remove the last replica, and add a new last replica.

In still other features, a method comprises storing data as entities in one or more tables, the data including structured and non-relational data. The method further comprises interfacing a plurality of replicas of the one or more tables to an application via a first interface. The application accesses the data from one of the plurality of replicas via the first interface. The method further comprises interfacing the plurality of replicas to a resource management service of a cloud computing system via a second interface. The resource management service manages resources of the cloud computing system based on the data stored in the one or more tables.

In other features, the method further comprises storing each replica from the plurality of replicas in a different data center to secure the data when one of the data centers fails.

In other features, the method further comprises generating an ordered set of the plurality of replicas of the one or more tables, performing a write operation by writing sequentially from a first replica to a last replica in the ordered set, confirming success of the write operation by verifying completion of the write operation sequentially from the last replica to the first replica, and reading from the first replica to prevent returning incorrect data when the write operation fails between the first and the last replicas.

In other features, the method further comprises generating a new replica, and adding the new replica subsequent to the last replica.

In other features, the method further comprises generating a new replica including data that is consistent with the first replica, generating the new replica in background, and adding the new replica subsequent to the last replica.

In other features, the method further comprises generating an ordered set of a plurality of replicas of the one or more tables, and performing a write operation by writing sequentially from a first replica to a last replica in the ordered set.

When the write operation fails on one of the replicas between the first and the last replicas, the method further comprises performing a repair operation on the one of the replica in background.

In other features, the method further comprises performing the repair operation on the one of the replica in background by adding an event in a storage queue when the write operation fails on one of the replicas between the first and the last replicas, and by activating a repair service that performs the repair operation in the background.

In other features, the method further comprises generating an ordered set of a plurality of replicas of the one or more tables. When a first replica in the ordered set fails, the method further comprises removing the first replica, using a last replica in the ordered set as a new first replica, and adding a new last replica.

In other features, the method further comprises generating an ordered set of a plurality of replicas of the one or more tables. When a last replica in the ordered set fails, the method further comprises removing the last replica, and adding a new last replica.

In still other features, a system comprises a processor and memory, and machine readable instructions stored in the memory. When executed by the processor, the machine readable instructions configure the processor to store data as entities in one or more tables. The data includes structured and non-relational data for managing resources of a cloud computing system. The machine readable instructions configure the processor to generate an ordered set of a plurality of replicas of the one or more tables, and to interface the plurality of replicas to an application via a first interface. The application accesses the data from one of the plurality of replicas via the first interface. The machine readable instructions configure the processor to interface the plurality of replicas to a resource management service of the cloud computing system via a second interface. The resource management service managing resources of the cloud computing system based on the data stored in the one or more tables. The machine readable instructions configure the processor to perform a write operation by writing sequentially from a first replica to a last replica in the ordered set, and to confirm success of the write operation by verifying completion of the write operation sequentially from the last replica to the first replica. The machine readable instructions configure the processor to read from the first replica to prevent returning incorrect data when the write operation fails between the first and the last replicas. The machine readable instructions configure the processor to perform a repair operation on the one of the replica in background when the write operation fails on one of the replicas between the first and the last replicas. When the first replica in the ordered set fails, the machine readable instructions configure the processor to remove the first replica, use a last replica in the ordered set as a new first replica, and add a new last replica. When the last replica in the ordered set fails, the machine readable instructions configure the processor to remove the last replica, and to add a new last replica.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIGS. 6-8 show per-row meta-data maintained in storage tables.

FIG. 9 shows a flowchart of a method performed by a recovery agent of a configuration service associated with the chain of replicas of the storage account.

FIG. 10 shows a functional block diagram of a simplified example of the configuration service associated with the chain of replicas of the storage account.

FIG. 11 shows an example of a logical data structure stored in a configuration store of the configuration service shown in FIG. 10.

FIG. 12 shows a flowchart of a method for updating a set of replicas stored in the configuration store shown in FIG. 10.

FIG. 21 shows status of read/write operations when data is read from the tail replica.

FIG. 22 shows status of read/write operations when data is read from the head replica.

In the drawings, reference numbers may be reused to identify similar and/or identical elements.

DESCRIPTION

Figure 1:
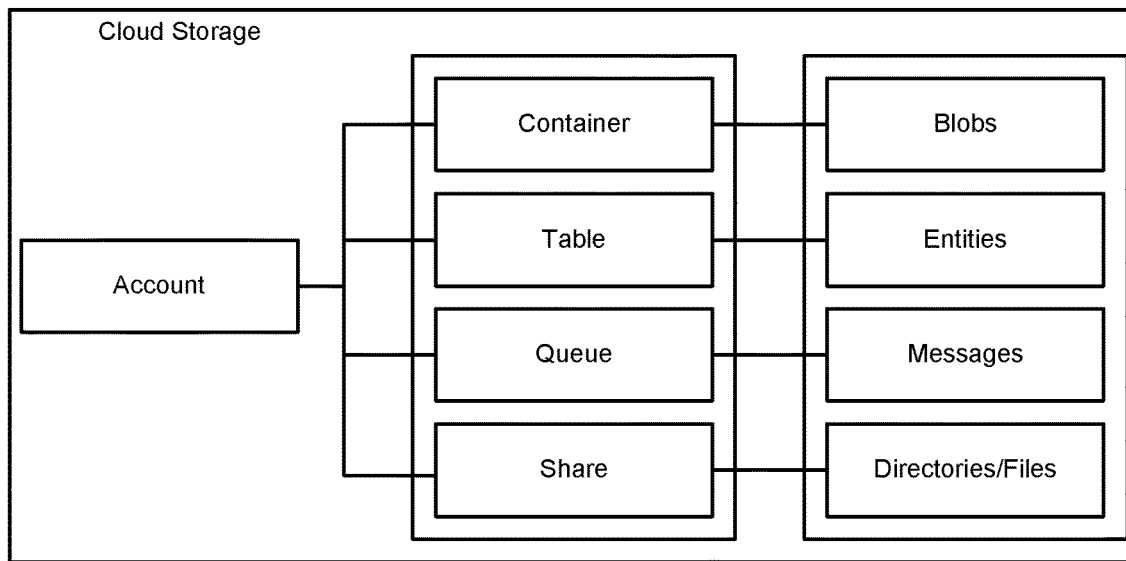
FIG. 1 shows relationships between cloud storage resources in a storage account.

The present disclosure proposes replicating a storage account of a cloud computing system across multiple data centers and maintaining a chain of the replicated storage accounts so as to withstand an outage of a storage account.

A front end of the cloud computing system and one or more applications access the replicated storage accounts and use the data stored in the storage accounts to manage the resources of the cloud computing system.

A client interfaces the front end and the applications to the replicated storage accounts using corresponding interfaces. Specifically, the present disclosure proposes provisioning the client with an interface used by the front end to access the storage accounts, in addition to the other interface that the client has and that is used by the applications to access the storage accounts, so that both the front end and the applications can access the replicated storage accounts using respective interfaces.

In addition, as explained below in detail, the present disclosure proposes reading from a head replica instead of from a tail replica, a two phase prepare-commit operation to push or propagate changes from head to tail replicas, and provisioning a back end repair service if a failure occurs in the middle of the prepare-commit operation. The replication architecture proposed by the present disclosure ensures that a read operation survives even if the head replica is down or if the tail replica is down. These and other features of the present disclosure are described below in detail.

The present disclosure is organized as follows. A brief overview of table storage and storage accounts in presented with reference to FIGS. 1-2. A simplified example of a cloud computing system, including the replicated storage accounts according to the present disclosure, is described with reference to FIGS. 3 and 4. The operation of replicas of storage tables including a replication table (RTable) application program interface (RTable API), an RTable library, the two phase prepare-commit operation, read-write operations, handling data center outages, and introducing new replicas in the chain of replicas is explained with reference to FIGS. 5-9. The operation of a configuration service, an RTable client, a configuration agent, and a configuration store associated with the replicas, including handling reconfigurations during inflight replication operations, is explained with reference to FIGS. 10-12.

The components of the replication table (RTable) system according to the present disclosure are described with reference to FIGS. 13-14. The RTable client according to the present disclosure is described with reference to FIGS. 14-15. Reading from the head replica instead of the tail replica, also called a safety read operation, is described with reference to FIGS. 16-19. Repairing a replica when a write operation fails in the middle of the chain of replicas is described with reference to FIG. 20. The manner in which a read operation can always survive in the RTable system of the present disclosure regardless of whether a head replica fails or a tail replica fails is described with reference to FIGS. 21-23. Thereafter, a simplified example of a distributed network system is described with reference to FIGS. 24-26, which can be used to implement the cloud computing system including the replicated storage accounts according to the present disclosure shown in FIGS. 3-4.

Before explaining the replication of storage accounts, cloud storage, particularly table storage, and storage accounts are briefly explained to better understand their replication and related architecture according to the present disclosure. Thereafter, the storage table replication where data is read from a tail replica is explained to understand its drawbacks and to understand improvements provided by reading data from the head replica, which is subsequently described.

Cloud computing enables new scenarios for applications requiring scalable, durable, and highly available storage for their data. Cloud storage is accessible from anywhere in the world, from any type of application, whether running in the cloud, on a desktop, on an on-premises server, or on a mobile or tablet device. Cloud storage exposes data resources via simple Representational State Transfer (REST) APIs, which are available to any client capable of sending and receiving data via Hypertext Transfer Protocol/Secure (HTTP/HTTPS).

Cloud storage provides the following four services: Blob storage, Table storage, Queue storage, and File storage. Blob Storage stores unstructured object data. A blob can be any type of text or binary data, such as a document, media file, or application installer. Blob storage is also referred to as Object storage. Table Storage stores structured datasets. Table storage is a NoSQL key-attribute data store, which allows for rapid development and fast access to large quantities of data. Queue Storage provides reliable messaging for workflow processing and for communication between components of cloud services. File Storage offers shared storage for legacy applications using the standard Server Message Block (SMB) protocol. Virtual machines and cloud services can share file data across application components via mounted shares, and on-premises applications can access file data in a share via the file service REST API.

FIG. 1 shows relationships between cloud storage resources in a storage account. A storage account is a secure account that gives customers access to services in a cloud storage 2. A storage account provides a unique namespace for a customer's storage resources. Storage accounts can be of two types: general-purpose storage accounts and Blob storage accounts. A general-purpose storage account gives customers access to cloud storage services such as Tables, Queues, Files, Blobs and virtual machine disks under a single account. A Blob storage account is a specialized storage account for storing unstructured data as blobs (objects) in the cloud storage 2.

Blob storage is useful for users with large amounts of unstructured object data to store in the cloud. Customers can use Blob storage to store content such as documents; social data such as photos, videos, music, and blogs; backups of files, databases, computers, and devices; images and text for web applications; configuration data for cloud applications; and Big data, such as logs and other large datasets. Every blob is organized into a container. Containers also provide a useful way to assign security policies to groups of objects. A storage account can contain any number of containers, and a container can contain any number of blobs, up to a capacity limit of the storage account.

Table storage is NoSQL key/attribute store with a schema-less design, making it different from traditional relational databases. With a schema-less data store, it is easy to adapt data as the needs of an application evolve. Table storage is a key-attribute store, meaning that every value in a table is stored with a typed property name. The property name can be used for filtering and specifying selection criteria. A collection of properties and their values comprise an entity. Since Table storage is schema-less, two entities in the same table can contain different collections of properties, and those properties can be of different types.

Table storage can be used to store flexible datasets, such as user data for web applications, address books, device information, and any other type of metadata that a service requires. Customers can store any number of entities in a table, and a storage account may contain any number of tables, up to the capacity limit of the storage account. Like Blobs and Queues, developers can manage and access Table storage using standard REST protocols. Table storage also supports a subset of the OData protocol, simplifying advanced querying capabilities and enabling both JSON and AtomPub (XML based) formats. For today's Internet-based applications, NoSQL databases like Table storage offer a popular alternative to traditional relational databases.

Queue storage provides a reliable messaging solution for asynchronous communication between application components, whether they are running in the cloud, on a desktop, on an on-premises server, or on a mobile device. Queue storage also supports managing asynchronous tasks and building process workflows. A storage account can contain any number of queues. A queue can contain any number of messages, up to the capacity limit of the storage account.

Since a File storage share is a standard SMB file share, applications running in the cloud can access data in the share via file system I/O APIs. Like the other cloud storage services, File storage exposes a REST API for accessing data in a share. Distributed applications can also use File storage to store and share useful application data and development and testing tools.

Figure 2:
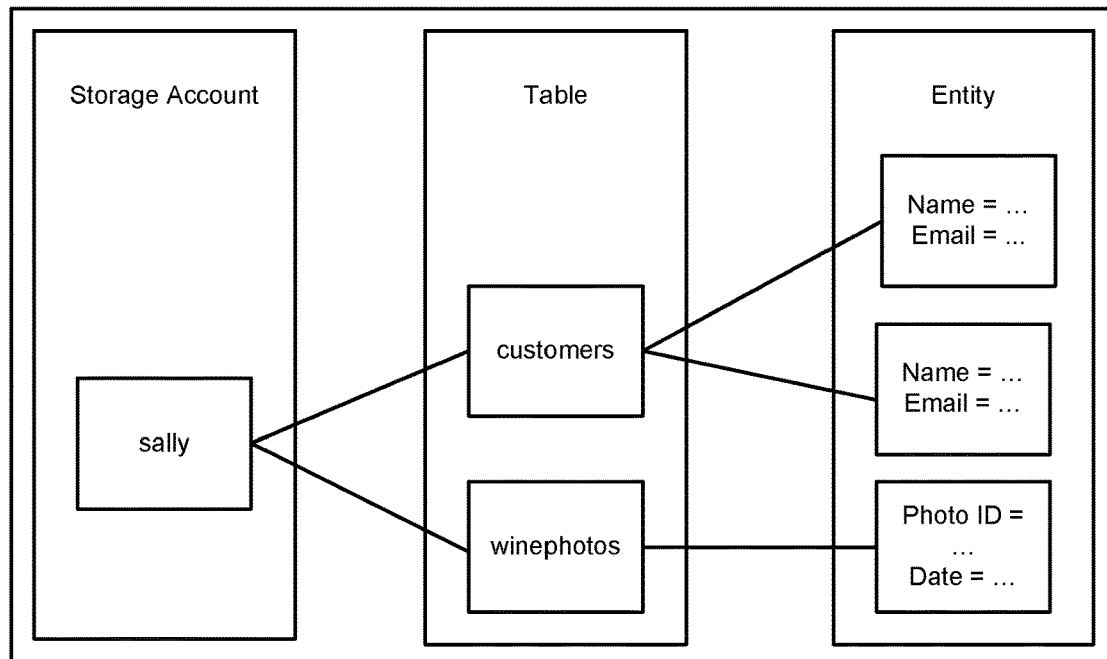
FIG. 2 shows an example of components of a Storage Table service.

FIG. 2 shows an example of components of a Storage Table service 4. For example, the components of the Storage Table service 4 include a storage account, tables, and entities. A Storage Table service offers structured storage in the form of storage tables. A storage account is a globally unique entity within the storage system. The storage account is the parent namespace for the Storage Table service and is the basis for authentication. A customer can create any number of storage tables within a given storage account as long as each table is uniquely named.

Storage Tables store data as collections of entities. Entities are similar to rows. An entity has a primary key and a set of properties. A property is a name, typed-value pair, similar to a column. The Storage Table service does not enforce any schema for storage tables. Therefore, two entities in the same storage table may have different sets of properties. Developers may choose to enforce a schema on the client side. A storage table may contain any number of entities.

A summary of storage accounts and storage tables that is useful for understanding the following disclosure follows. Storage account: All access to cloud storage is through a storage account. Storage Table: A storage table is a collection of entities. Storage Tables don't enforce a schema on entities, which means a single storage table can contain entities that have different sets of properties. The number of storage tables that a storage account can contain is limited only by the storage account capacity limit. Entity: An entity is a set of properties, similar to a database row. For example, an entity can be up to 1 MB in size. Properties: A property is a name-value pair. For example, each entity can include up to 252 properties to store data, and each entity can have 3 system properties that specify a partition key, a row key, and a timestamp. Entities with the same partition key can be queried more quickly, and inserted/updated in atomic operations. An entity's row key is its unique identifier within a partition.

Figure 3:
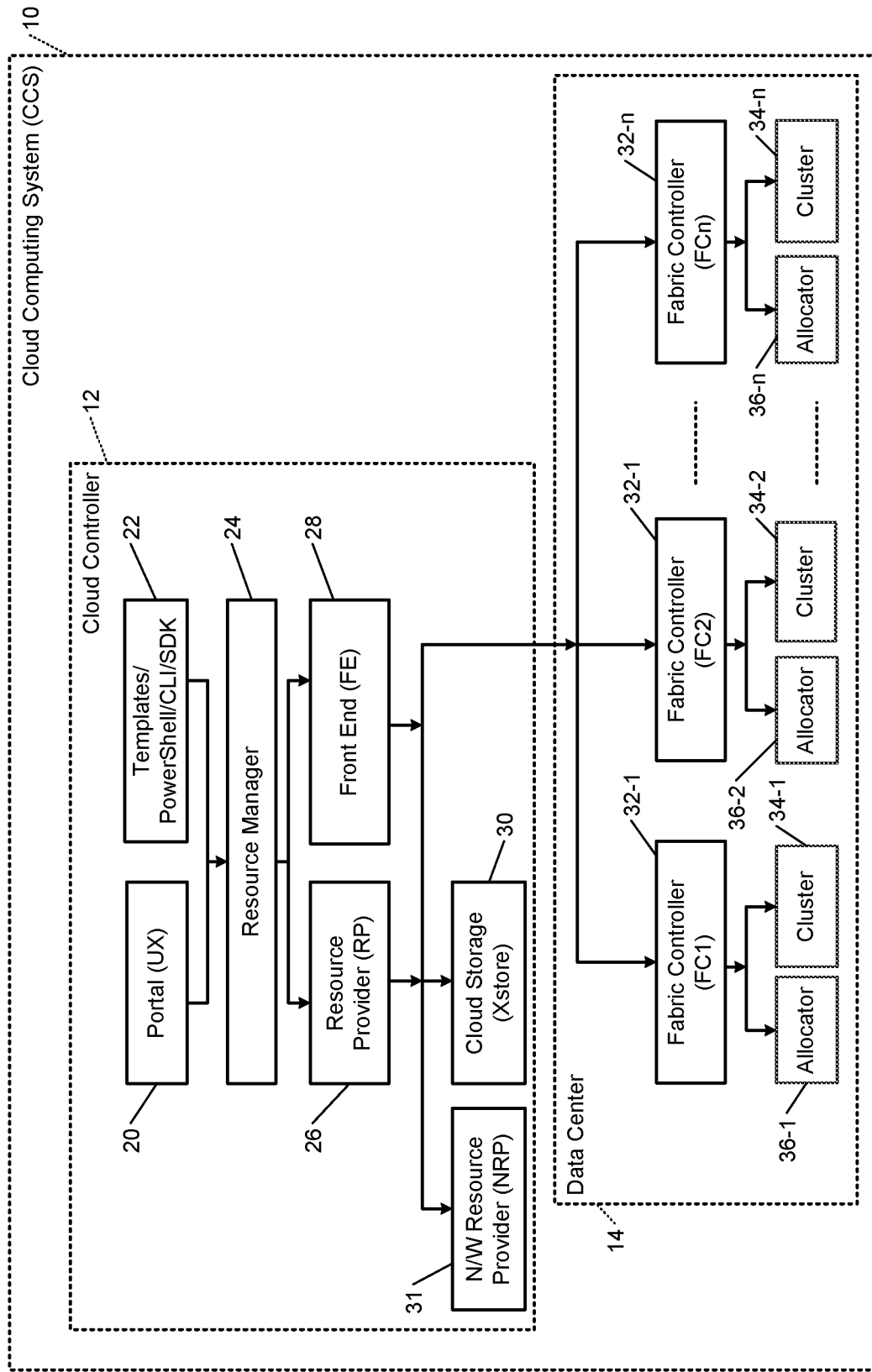
FIG. 3 is a functional block diagram of a simplified example of a cloud computing system.

FIG. 3 shows a simplistic example of a cloud computing system (CCS) 10 according to the present disclosure. The cloud computing system 10 includes a cloud controller 12 and at least one data center 14. While only one data center 14 is shown for simplicity, the cloud controller 12 can interface with a plurality of data centers. Further, while the data center 14 is shown as being local to the cloud controller 12, one or more data centers may be geographically remote from the cloud controller 12, may be located in different geographic locations (e.g., in different time zones, different countries or continents, and so on), and may communicate with the cloud controller 12 via various networks. The cloud controller 12 controls one or more data centers 14.

Each data center 14 includes a plurality of fabric controllers 32-1, 32-2, . . . , and 32-n (collectively fabric controllers 32) and corresponding clusters 34-1, 34-2, . . . , and 34-n (collectively clusters 34). Each fabric controller 32 controls a respective cluster 34. Each cluster 34 includes a plurality of racks (not shown), and each rack includes a plurality of nodes (also not shown), which are also called servers, hosts, or machines throughout the present disclosure. Each fabric controller 32 is associated with an allocator 36 that allocates resources within the cluster 34 for instances of customer services hosted on the cluster 34.

The cloud controller 12 includes a portal 20 and a software development kit (SDK) 22 that the customers can use to select resources and request service deployment. The cloud controller 12 further includes a cloud resource manager 24, a compute resource provider 26, and a front-end 28. The front-end 28 interfaces with the fabric controllers 32 of one or more data centers 14. The cloud resource manager 24 receives the customer selections and forwards the customer selections to the compute resource provider 26. The compute resource provider 26 generates a tenant model based on the customer selections. The compute resource provider 26 provisions resources to the customer services according to the tenant model generated based on the customer selections. The compute resource provider 26 provisions storage, networking, and computing resources by interfacing with a cloud storage (Xstore) 30, a network resource provider 31, and the fabric controllers 32.

Figure 4:
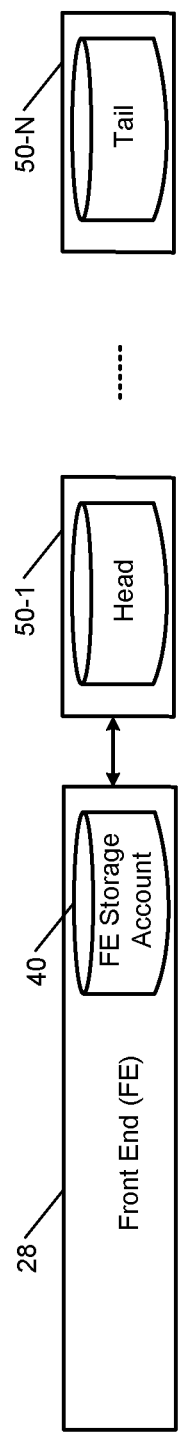
FIG. 4 shows a front end of the cloud computing system of FIG. 3 including a storage account.

FIG. 4 shows that the front end 28 includes a storage account 40. For example, the storage account 40 may include one or more storage accounts shown in FIGS. 1-2. The front end 28 interfaces with a plurality of replicas of the storage account 40. For example, the replicas of the storage account 40 include an ordered set of a head replica 50-1, followed by one or more replicas, and a tail replica 50-N, where N is an integer greater than 1 (collectively replicas 50). For example, each of the replicas 50 may be located in a different data center 14.

In a cloud computing system (e.g., the CCS 10 shown in FIG. 3), many services (both internal and external to the cloud computing system 10) use Table Storage to store and query structured, non-relational data. Table Storage provides a nice and simple NoSQL abstraction to store data as rows in a table and allow queries in a table based on a primary key.

The data in a storage account is replicated to ensure durability and high availability. Replication copies the data, either within the same data center, or to a second data center, depending on the replication option selected. Replication protects the data and preserves application up-time in the event of transient hardware failures. If the data is replicated to a second data center, that also protects the data against a catastrophic failure in the primary location.

The underlying Cloud Storage infrastructure replicates data asynchronously across data centers, which means that it can only bound the amount of data loss when there are Cloud Storage stamp failures. More specifically, Storage Tables cannot prevent data loss or provide consistent recovery. While some services do not need stringent durability and consistency guarantees, data loss or inconsistent recovery can affect other services. For example, in the event of a network or storage outage, services dependent on Cloud Storage can suffer management plane outage.

As a step towards addressing this problem, the present disclosure provides a design of a replication table (RTable)

system that synchronously replicates a Storage Table across multiple data centers to provide the following guarantees despite data center outages: (1) high data durability by preventing data loss despite fixed number (t) of data center failures, (2) high availability by providing consistent and quick recovery from failures without giving up on durability guarantee. These guarantees enable immediate failover to a secondary storage stamp while ensuring zero data loss and strong consistency.

The RTable design can meet the following design constraints while providing the above durability and availability guarantees. Replication cost: The RTable design can keep the replication cost (storage and networking) low. Specifically, the RTable design can use protocols that tolerate (t) data center failures with as few replicas as possible. To meet the durability guarantees, the RTable design cannot use fewer than (t+1) replicas. The replication cost (not to exceed (t+1) replicas) and durability guarantee (no data loss despite (t) failures) are primary constraints in designing the RTable system.

Compatibility: Many tools (e.g., analytical and monitoring) use Storage Table interfaces to read data from a single replica. Most such services can run unmodified and uninterrupted even after replicating the data. An RTable protocol can ensure that such queries are reading consistent data even under network partitions.

Client library: The RTable design can build replication on top of unmodified Table storage. Specifically, the replication protocol can be run by a stateless client library assuming only a passive Table storage system. Hence, the RTable design can be robust to client failures.

Monitoring and configuration service: Any replication protocol requires a service where the information on current view of the system (set of replicas) is maintained. This can be done by human operators, who change the replica membership on failures. The RTable design can build this service into the client library (using a fault-tolerant Cloud Storage-based leader election protocol, which can tolerate a single Cloud Storage stamp failure) that can automate the monitoring and configuration process.

The RTable design can support all Table Storage calls in an RTable API so that client applications have to make minimal changes. The present disclosure describes how RTable implements Retrieve and InsertOrReplace calls to read and update rows in replicated table.

The RTable design uses chain replication protocol. Broadly speaking, chain replication (sequential protocols) and quorum-based replication (parallel protocols) are the two main techniques for synchronously replicating data. The main reason for choosing chain replication is its low replication cost ((t+1) replicas can tolerate (t) failures), low read overheads (read from a single replica), better load balancing of reads (read from any replica), and its simplicity (simpler recovery mechanisms on failures). The tradeoffs and the design rationale for choosing chain replication in the RTable system are discussed in detail later in the present disclosure.

Client applications read and write to RTable rows using the RTable Retrieve and InsertOrReplace API calls. Internally, an RTable library synchronously replicates data across multiple data centers to tolerate individual Table failures.

The RTable library is now described in detail. The replication protocol is completely implemented inside the client library on top of a Storage Table API. When a client application calls the RTable library to read/write, the RTable library interacts with individual storage Table replicas underneath using the Storage Table APIs. The RTable library uses chain replication where replicas are arranged in an ordered chain so that locks are acquired and released in order along with writing and committing data as shown in FIG. 5.

Figure 5:
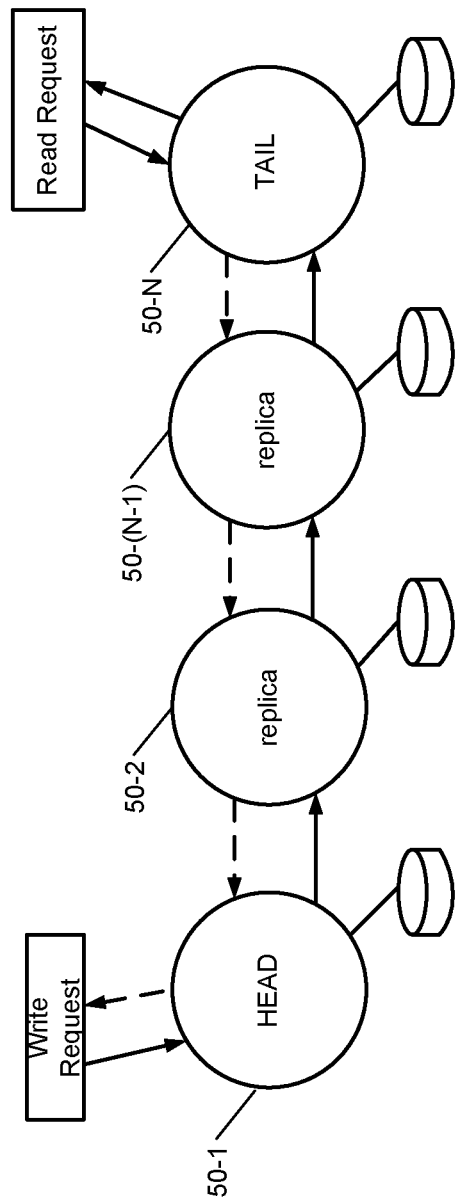
FIG. 5 shows a chain of replicas of the storage account arranged as an ordered set.

In FIG. 5, the first replica in an ordered set of N replicas (where N is an integer greater than 1) is called the head replica (52-1). The last replica in the ordered set of replicas is called the tail replica 50-N. The remaining replicas in the ordered set of replicas are called middle replicas (50-2, . . . , and 50-(N−1)).

The RTable library gets a current set of replicas from a configuration service along with a lease time during which the set of replicas cannot change. The RTable library updates the replica set (or view) periodically, after the expiry of lease interval. A configuration service (explained below) is used to update the view (set of replicas) at the end of current lease interval if individual Table replicas are not reachable and are deemed as failed replicas, and to start providing a new view in a next lease period. When Table failures occur, clients observe timeouts and failures for write operations until the clients receive a new view once the lease expires. For read operations, the client can fetch data from any replica as explained below if there are no conflicting write operation is in progress or fetch the data from the tail replica if a conflicting write operation is in progress. Read operations are only blocked if a tail node (i.e., the tail replica) fails.

FIGS. 6-8 show that the RTable system maintains per-row protocol meta-data to recover rows correctly from client and data center failures. The RTable system adds four properties (columns) to entities (rows) to maintain its per-row replication state: Version (V), lock bit(L), lock acquisition time (Ltime), and view id (Vid) as shown in FIG. 6. LTime is wall clock time set when a client acquires a lock on a row. The RTable system uses LTime to detect incomplete operations (due to client failures) so that other clients (or a periodic cleanup process) can complete the incomplete operations and unlock the row. The RTable system uses the Version number to keep track of the latest version of a row. The RTable system also uses the version number as a virtual etag for the replicated row when it performs read-modify write operations on rows (such as Replace) given that underlying replicas may have different physical etags for a row. View id is an index supplied by the configuration service, which internally maps the index to a set of replicas that were active when a row was modified. The RTable system uses this information to keep track of the chain membership, reconcile the replicated state of surviving replicas on replica failures, and bring a reinstated replica back to a consistent and up-to-date state when the reinstated replica is added back to the chain of replicas.

The write protocol is as follows. When a client updates or inserts a row, the RTable system uses chain replication protocol to synchronously replicate the new data across all replicas before sending the response back to the client. The RTable system interacts with the replicas sequentially in an ordered chain from the head replica to the tail replica during the execution of a two phase protocol as explained below.

The following description of the two phase protocol uses two assumptions: 1) View and version numbers are monotonically increasing and do not wrap around. 2) Any new replica is always introduced at the head with a view change.

The first phase is called a prepare-and-lock phase. When an application modifies a row in the RTable, the client library first reads that row at the head replica. If the view number read at the head is the same as the current view, the client library attempts to atomically set the lock bit at the head replica first. This can be done using a Table Replace( ) call that provides read-modify-write semantics using etags. If the view at the head replica is higher than the client's view, the client library refreshes the view and reattempts to acquire the lock at the head replica in the new view.

If a client cannot acquire the lock—either because the lock bit is already set or setting the lock bit fails with a conflict exception—the client library backs off and waits until the current lock owner releases the lock or LTime expires for the current lock, at which point the client finishes any unfinished update left over by a faulty client before acquiring the lock.

The head replica acts as a synchronization point so that only one client can proceed with a write operation when there are concurrent updates to the same row from multiple clients. However, updates to different rows can happen in parallel as there is a separate lock bit per row.

If and when a client acquires a lock at the head replica, the RTable system also overwrites data (and its version) in place along with the lock bit atomically as it is part of the same entity. The RTable system then acquires locks and updates data at other Table replicas sequentially in the chain of replicas until it reaches the tail replica. The locking phase ends when locks are acquired at all replicas. FIG. 7 shows the states of the replicas at the end of this phase.

If a client fails to acquire a lock at a replica other than the head replica due to a conflict exception, this must be due to a view change and the current replica has become the head replica in the new view. The client refreshes its view and follows the protocol described above for writing to the new head replica.

The second phase is called a commit and unlock phase. The RTable system starts the second phase by unlocking and committing data at the tail replica first. The RTable system then continues by unlocking and committing at every replica sequentially in the reverse path of the chain, starting at the tail replica and moving towards the head replica. The RTable system then returns a success indication to the client application for the write operation. FIG. 8 shows the states of the table replicas after the commit phase.

An optimization can be performed as follows. Given that the last step of the first phase and the first step of the second phase occur consecutively at the tail node (i.e., the tail replica), the prepare and lock step can be skipped at the tail node by directly committing the data at the tail node in a single step, and starting the second phase from the predecessor of the tail node.

The tail replica has the authoritative copy of the data. Note that the tail replica atomically commits the data first before any other replica. Hence, the tail replica acts as an authoritative copy from which clients can read the latest committed data and provide strong consistency (linearizability for single row reads/writes).

The read protocol is now explained. When a client reads data from RTable (i.e., the set of replicas), the RTable system can always fetch data from the tail node (i.e., the tail replica). Since all write operations are committed on the tail replica first, the tail replica is guaranteed to have the latest committed data.

An optimization can be performed as follows. The RTable system can use the lock bit to implement a read optimization where clients can read from any replica instead of just the tail replica. If the lock bit is not set, the RTable library returns the data. If the lock bit is set, the RTable library discards the result and fetches the data from the tail node.

Client failures during read and write operations are handled as follows. The RTable system recovers from client failures using the protocol meta-data stored in a row. A recovery operation is run completely on the client side without requiring any support from external services.

Client failures in the middle of a read operation do not require any clean up as read operations do not change any state in the system. Clients retry on failed read operations and are guaranteed to receive consistent data when the read operations succeed.

Also, read operations are not blocked by incomplete write operations due to faulty clients because the tail node collates the phase 1 and phase 2 operations into a single, atomic Table write operation. That is, RTable does not set the lock bit at the tail node. A client can always read from the tail node independently of the status of other concurrent write operations.

Clients can fail in the middle of a write operation and leave the system in an inconsistent state across replicas. However, the recovery process according to the present disclosure ensures correctness by allowing other clients to finish incomplete write operations left over by faulty clients. Below are various failure scenarios and how the RTable system handles them correctly.

If a client fails before it acquires the lock on head, no action is necessary as the operation has not started from replicas' perspective. If, however, a client fails after acquiring the lock but before the success indication is returned to the application, the following three cases are possible.

First, the client can fail before the end of first phase where it acquires a lock on the head node but a lock is not acquired on other replicas. (Note that a lock bit is never set on the tail replica.) In such a case, other clients cannot write to the row until Ltime (lock expiration time) for the row expires. Until then writes to the row fail. After the expiration of Ltime, other clients clean up the row on behalf of the faulty client by completing the incomplete operation. The other clients proceed by starting the write operation from where the faulty client left off, acquire locks in the first phase, commit and release the locks in the second phase. As locks and data are updated atomically at the head replica, the cleanup process has all the data required to complete the operation by reading the head replica. After the cleanup is done, clients can continue to write to the same row.

Second, a client can fail in the second phase before the head node unlocks and commits the data (atomic operation). In this case, the data was at least committed at the tail node, which may have been read by some other client(s). The RTable system has to make sure that this data is committed at other replicas eventually to ensure consistency. Given that the head node has not released the lock, no other client writes to the row until a client runs the cleanup process to release the locks first. This means that eventually a client that is trying to acquire the lock, completes the operation by running the second phase and committing the operation before releasing the lock at the head replica.

Third, a client can fail after the end of second phase but before the client receives the acknowledgement. In this case, the operation has been completed at all replicas, and there is nothing to be done. Other clients are not blocked because the lock on the head replica is released.

Therefore, in all cases, the RTable system can recover from client failures correctly by always completing incomplete write operations, eventually, by other correct clients so that a client never sees data that is revoked later. Once an update reaches the head, the update is never lost due to client failures.

Data center outages are handled as follows. When a data center is not reachable due to network partitions or geographical disasters, the RTable system ensures consistent recovery by changing the view in the configuration service, which removes the faulty replica (data center) from the set of replicas. Clients read the current view from the configuration service, cache the current view locally, and update their local copy periodically when the view lease time expires. The read availability and write availability are described below.

Read operations are not affected by non-tail replica failures as the tail replica can continue to service read requests despite failures. However, when a tail replica fails, other replicas can still provide data if the lock bit is not set for the row being accessed because other replicas can respond after the other replicas commit and unlock their local bits. However, if the lock bit is set at every available replica then read operations to a row fails until the view is changed and the row write operation is completed using the recover protocol described above.

When a data center fails, write operations fail until the view is changed and the faulty replica is removed from the chain. Hence, write availability depends on how quickly the monitoring and reconfiguring service (described below) detects and repairs the chain by replacing the faulty replica (to run with the same durability guarantees) or by removing the faulty replica (to run at lower durability with fewer replicas until the faulty replica is replaced). It is impossible to get around this constraint while meeting the durability guarantee of tolerating (t) data center failures using only (t+1) replicas.

Introducing new replicas or reintroducing partitioned replicas is now described. The RTable system allows introduction of new replicas or reintroduction of old partitioned replicas into the system. However, both new and old replicas do not have data that is consistent with existing replicas in the chain. It is important that these replicas are (re)introduced carefully without affecting consistency.

The configuration service uses an active recovery mechanism to introduce new replicas or reintroduce existing replicas into the chain without stalling read or write operations. The configuration service uses the notions of read-view and write-view to achieve this. A read-view has only the existing replicas of the chain and provides a consistent view for read operations. A write-view has both existing replicas and the new replicas prefixed to the read-view chain so that new write operations go to both sets of replicas.

Client applications use read-view to read data and write-view to write data. During a write operation (during lock or commit phase; and before returning write operation success indication to a client), if a client detects that RTable read-view and write-view are different, the client first invokes a recovery protocol 100 shown in FIG. 9 before continuing with its write operation. The client only needs to invoke the recovery protocol for a row once, so it can continue writing to the same row without invoking recovery again.

In FIG. 9, the configuration service starts a recovery agent to asynchronously copy data from the read-view to the new replicas by iterating over rows in the head of the read-view and following the protocol as shown. At 102, the recovery agent reads a row at the head of read-view and at the head of write-view. At 104, the recovery agent checks whether the view ID of the write-view is greater than or equal to the view ID when the replica was introduced. The recovery agent stops if the view ID of the write-view is greater than or equal to the view ID when the replica was introduced. At 106, if the view ID of the write-view is less than the view ID when the replica was introduced, the recovery agent checks whether the row exists in the read-view. At 108, if the row does not exist in the read-view, the recovery agent deletes the row from the write-view, and the recovery agent stops.

At 110, if the row exists in the read-view, the recovery agent checks whether the row is locked in the read-view. At 112, the recovery agent attempts to take lock at the head of the read-view. At 114, the recovery agent checks whether the attempt to take lock at the head of the read-view succeeded. The recovery agent returns to 102 if the attempt to take lock at the head of the read-view failed. At 116, if the attempt to take lock at the head of the read-view succeeded, the recovery agent updates or inserts row from the read-view to the write-view. At 118, the recovery agent unlocks the head of the read-view unless it is already locked. At 120, if the lock expired, a flush2pc operation (described below) is performed, and the recovery agent stops.

After the recovery client is done iterating over the rows, the new replicas are up to date. Any writes that happened while the recovery was in progress, have already been written to the new replicas. The tail replica continues to hold the authoritative copy.

The recovery client returns a success indication to the configuration service, which in turn changes the read-view and write-view to include all the replicas in the chain. Clients get the new read-view and write-view with all replicas included in them. This change to the view does not need to occur atomically and is propagated to all clients eventually. The protocol still ensures correctness if some clients are operating in the old view while others are operating in the new view since they all start write operations from the write-view head and read from the same tail replica.

Multiple view changes can take place before a previous view becomes stable, i.e., the read-view and the write-view have the same replicas. The protocol handles this by following the above procedure for the chain that is prefixed to the read-view.

For insert operation, the client first creates a tombstone entry (without any data) for the row with the lock bit set on the head replica. The client then inserts the row at the head replica first and then at the other replicas along the chain. This prevents a race condition between the client and the recovery agent due to lack of sunset on the Storage Tables.

The following scenarios could occur: 1) At time T1, there is only replica R1 in view v1. R1 is both the head replica and the tail replica. 2) A client C1 issues an insert for row K1 on replica R1. 3) View changes to v2, and replica R2 is introduced. 4) The recovery agent finds that row K1 does not exist on replica R1 and declares that replica R2 is in sync with replica R1. 5) View changes to v3. 6) Insert on row R1 from step #2 above completes on replica R1.

If the tombstone entry is not inserted first then the recovery agent might conclude that the row does not exist while the insert operation might complete at a later time on the tail replica. This will leave the tail replica ahead of the other replicas, which violates the chain protocol. This is fixed by forcing client C1 to insert a tombstone entry for row K1 first before the real row is written. The tombstone entry avoids the race condition between the original client and the recovery agent.

An optimization can be performed as follows. If the replica being introduced has updates up to a certain view id (M), then the recovery client can do incremental updates by skipping any rows that were updated in views <M−1. This does not handle deletes as those entries will not be present in the read-view. To ensure faster recovery, it may be worthwhile to create a new table to keep track of the all the deleted entries while the RTable system is running with a low replica count. This can ensure that any deletes that occurred while the replica being re-introduced had an outage can be deleted on the replica before adding it back to the write view.

The RTable design tradeoffs are now described. Broadly, there are two approaches to replicate data synchronously with different tradeoffs: chain replication (sequential) and quorum-based replication (parallel) protocols. The following are the tradeoffs, initial assumptions, and the metrics that are optimized, to justify using chain replication protocol in the RTable design. The tradeoffs include simplicity, minimal replication cost, read availability and latency, and write availability and latency as described below.

The chain replication protocol has a rather simple recovery protocol. To recover a row, the recovery process picks up a locked row from the head replica and proceeds through the chain using the two phase chain replication protocol. There is no need to rollback an incomplete write. This makes it possible to implement the recovery protocol entirely in the client library as part of regular read and write operations. The same protocol is used to bring new replicas into rotation without blocking reads.

The reasons for not using parallel protocols are as follows. Quorum-based protocols are difficult to implement entirely in the client. Furthermore, they require a different read protocol, which means existing clients cannot work as is. While these protocols have an additional disadvantage of serializing all requests and generating a global order, the RTable protocol executes independent requests in parallel by maintaining fine-grained locks.

Chain replication keeps the replication cost low and meets the lower bound of (t+1) replicas. Note that to tolerate (t) simultaneous data center failures, data needs to be replicated at least to (t+1) data centers. In addition, the RTable system does not require any write-ahead log or maintaining multiple versions of data.

Again, the reasons for not using parallel protocols are as follows. Majority-based quorum systems require (2t+1) replicas to tolerate (t) failures. The chain replication protocol can be seen as a specific type of ROWA (Read-one-write-all) quorum system. Other protocols may be used by relaxing the cost constraints if applications are fine with higher replication cost.

Chaining the replicas provides significant advantages to read-heavy workloads compared to quorum-based systems. For example, the advantages can include low overhead read operations, load balancing, compatibility, and read availability.

Regarding low overhead read operations, in the RTable system, clients usually read from a single replica (or at most two) with fewer bytes transferred in the network. In contrast, majority-based quorum requests have to read from (t+1) replicas requiring more network bandwidth. Regarding load balancing, the RTable system provides better load balancing for read operations than majority quorums as clients can read from any replica when there are no concurrent updates (details are provided below). Regarding compatibility, existing tools that read from un-replicated Tables can continue to work unmodified; they can just read from the tail replica, which always has the latest data.

Regarding read availability, in the RTable system, read operations are non-blocking when any or all of the (t) non-tail nodes fail. Read operations, however, block when there is a tail node failure until the fault is detected, the faulty tail node is ejected from the chain (view change) and another live replica (predecessor) is chosen a new tail replica. On the contrary, majority quorum systems provide better read availability as they do not block on any node failure up to (t) failures out of (2t+1) replicas.

Regarding write operations, the chain replication trades the above advantages with the following compromises for write availability and latency. Write latency: Write operations to the replicas proceed sequentially in a chain leading to higher latency (end-to-end latency=f(sum of latencies to replicas)) compared to quorum-based systems, which exchange messages in parallel (end-to-end latency=f(max latency of all replicas)). Latency in the RTable system can be reduced by writing to non-head and non-tail nodes concurrently, but it slightly complicates the recovery mechanism. Availability: Write operations are blocked when a replica fails until the chain is reconfigured by removing it. Note that it is impossible to get around this drawback using (t+1) replicas as write operations cannot return a success indication to the application without writing to all of the (t+1) replicas to provide durability despite (t) failures. The RTable system may be able to use quorum based approaches for writing to the middle nodes and provide better availability by paying additional replication cost.

FIG. 10 shows the configuration service described above, which is now described in further detail. A configuration service 150 includes a configuration store 152, one or more RTable clients 154-1, . . . 154-N, where N is an integer greater than or equal to 1 (collectively RTable clients 154), and a configuration agent 156.

The configuration service 150 is responsible for storing and updating the current view (chain) of the RTable system while ensuring safety of the data. The configuration service 150 includes (a) the highly-available configuration store (for example, using replicated blob store) 152 to store the current configuration and (b) the configuration agent 156 that is responsible for failure detection and reconfiguration of the RTable system to ensure progress. The RTable clients 154 learn the current configuration by reading the configuration store 152, which is initialized and updated by the configuration agent(s) 156.

The configuration service 150 uses a leasing mechanism to allow the RTable clients 154 to read the configuration state and cache the configuration state for the lease duration without compromising safety under the assumptions described below. Thus, the configuration service 150 improves the latency of RTable read/update operations and provides good scalability with the number of RTable clients 154 by avoiding reading the configuration store 152 on every read or update operation.

The configuration service 150 uses these assumptions: 1) A clock of the configuration agent 156 does not advance faster than the clocks of the RTable clients 154 more than a known constant bound, called a clock factor (CF). 2) No new operation is issued to the RTable of replicas after the lease time has expired. Note that the operation may finish after the lease has expired since the RTable system does not control the server side.

The configuration store 152 has the chain replica set, an associated lease duration, and a version number. FIG. 11 shows an example of a logical data structure 160 stored in the configuration store 152. In the logical data structure 160, a replica chain stores an ordered list of the replicas. Write view starts at index 0. Read view starts at a replica index specified in Read head index. Each replica also has an associated version number during which that replica was introduced. This version number is used during a repair operation as described above in the discussion about introducing new replicas or reintroducing partitioned replicas.

The ViewId is incremented anytime there is a change to the row. For example, when introducing a replica back into the system, the ViewId is incremented, and the read view and write view are different. When the write view has caught up to the read view, the ViewId is incremented again, and the read-head-index is set to zero.

The Lease duration is the time duration (in seconds) for which the chain configuration is valid from the time the chain configuration is read. Every time an RTable client 154 reads the chain configuration, the lease of the chain configuration is renewed for the Lease duration. The RTable client 154 must not use a chain configuration for which the lease has expired. The RTable client 154 should also account for transmission delays in the network.

The RTable client 154 reads a chain configuration and assumes that the lease of the chain configuration is valid for the lease duration. The RTable client 154 renews the lease, e.g., reads the chain configuration from configuration store, at the following events: 1) The RTable client 154 periodically renews the lease, ideally before the lease has expired. To ensure that the RTable client 154 makes at least two attempts at acquiring the lease before the lease expires, the renewal should be tried every ((lease duration/2)−1) seconds. 2) Before starting a new read or write transaction, the RTable client 154 should check if the lease will remain valid when the transaction finishes (based on maximum transaction time). If the lease might expire before the transaction finishes, the RTable client 154 should start an asynchronous renewal request in parallel to the transaction. If the lease has expired when the transaction finishes, the RTable client 154 should discard the result and wait for the lease renewal before retrying the transaction.

Any RTable or external client can serve as a configuration agent. At any given time only one configuration agent can update a configuration. This is ensured via reliable leader election. Reliable leader election can be done using blob leases.

A failure of an RTable replica is presumably detected manually. This can be easily automated once the configuration agent 156 is built into a RTable client 154. The configuration agent 156 can actively and passively monitor all the storage accounts in a given chain and determine whether they are up or down. Further, each RTable client 154 can send health reports to the configuration agent 156. This allows for handling cases where the configuration agent 156 finds the replicas healthy but some of the RTable clients 154 may not.

Once a failure is detected, the configuration agent 156 is used to reconfigure the chain appropriately. Similarly, when a failed replica is back online or a new replica is to be brought online, the configuration agent 156 is used to add the new replica back to the pool of replicas. The configuration agent 156 is also responsible for bringing the new replica up to speed (i.e., with consistent data) following the protocol described above.

FIG. 12 shows a method 200 for updating the replica set stored in the configuration store 152. The replica set stored in the configuration store 152 is updated as follows. Suppose that the maximum clock factor time for lease duration L is CF. In the general case, the configuration is updated from version v1 to v2 as follows: 1) At 202, the configuration agent 156 deletes the current configuration version v1 from the configuration store 152. 2) At 204, the configuration agent 156 waits a constant time L+CF. This can ensure that no new transactions start in the old view. A transaction started in v1 may still complete in v2 but that is handled by the repair operation. 3) At 206, the configuration agent 156 writes the new configuration v2 to the configuration store 152.

The configuration store 152 can be implemented using replicated blobs. The RTable system uses majority quorum ((2t+1) replicated blobs to tolerate (t) failures) to store configuration state with high availability. The RTable clients 154 perform a quorum read operation on the configuration store 152 to determine the current configuration. On a quorum read operation to the replicas, an RTable client 154 accepts the configuration state if the RTable client 154 receives a majority of blobs with the same version number and the configuration state.

Write operations to the configuration store 152 are not complete until the state is written to a majority of the replicas. The configuration agent 156 is responsible for ensuring that all replicas of the configuration store 152 are in sync (i.e., synchronized) eventually. To deal with temporary unavailability of replicas, the configuration agent 156 can periodically read the configuration from all the replicas and update any replicas that have fallen behind. If the configuration agent 156 fails to update any replica for an extended period of time (e.g., 48 hours), the configuration agent 156 can raise a critical alert that needs to be attended to by an administrator.

In the RTable system, control path is separate from data path. Specifically, while the RTable system replicates the application data, a different configuration service is used to replicate the configuration state. The control path (using the configuration service) is separated from the data path (using RTable) as they involve different cost-reliability-performance tradeoffs. Specifically, the RTable system uses (t+1) replicas to store the application state while using the configuration service with (2t+1) replicas to store the control data (configuration state). Given that failures are uncommon, such a separation gives cost and performance benefits. The RTable system uses fewer replicas ((t+1) as opposed to (2t+1) for any quorum based protocols) with improved read (only needs to read from a single replica) and recovery (any sub-chain has consistent state on failures) latencies. Write latencies of the RTable system are comparable to any parallel quorum-based protocols for practical values of (t) (<=2) in most cases.

The reconfigurations of the replica chain are handled during in flight replication operations as follows. Under certain failure scenarios, a chain reconfiguration can occur during an inflight write transaction. Further, since Cloud Storage operations do not have a sunset time on them, a write request could be issued in one view but complete in a different view. The RTable write protocol deals with this scenario by refreshing the view at the end of any write. If a new replica has been added to the chain, the RTable system invokes the repair protocol. The RTable system then continues the write operation in the new chain.

The following invariants are part of the design of the write protocol used by the RTable system: 1) Both version and view are monotonically increasing values. They do not wrap around. 2) Write operations that reach the tail replica are always committed even in the presence of view changes. 3) If during the prepare phase, a client has acquired a lock on the head replica in the current view, then that write operation will always be eventually committed at the tail replica under the condition that at most one of the two—the head replica and the client performing the write operation—fail simultaneously. This is possible because any client can flush incomplete write operations. 4) During the prepare phase, all replicas in the current view must have the same version for each row. 5) During the commit phase, if the lock bit of a replica is 0 (i.e., not set), then that replica must be in an older view. 6) During the commit phase, if the version of a replica is less than version on the tail replica, then that replica must be in an older view.

The following invariants are part of the design of the read protocol used by the RTable system: 1) Only committed data is returned from a read operation. 2) No committed data (that might be read) will ever be overwritten by a concurrent write operation or a view change unless all replicas fail simultaneously.

In FIG. 3, the front end 28 of the cloud computing system 10 provisions a cloud resource management web service. Customers can call a web API of the front end 28 to manage their cloud resources globally, such as hosted Services, deployments (PaaS/IaaS), and storage accounts. A front end of a cloud computing system typically maintains data in a single storage account. If the storage account has any outage, the front end service is down globally and customers cannot manage their resource in any region.

The front end 28 uses the RTable system of the present disclosure so that the front end 28 can recover from a single storage account outage with zero recovery point objective (RPO), which is the maximum targeted period in which data might be lost from a service due to a major incident. The RTable system provides zero RPO by chained replication, locks the head replica to prevent concurrent write operations, and does not increase read latency.

Figure 13:
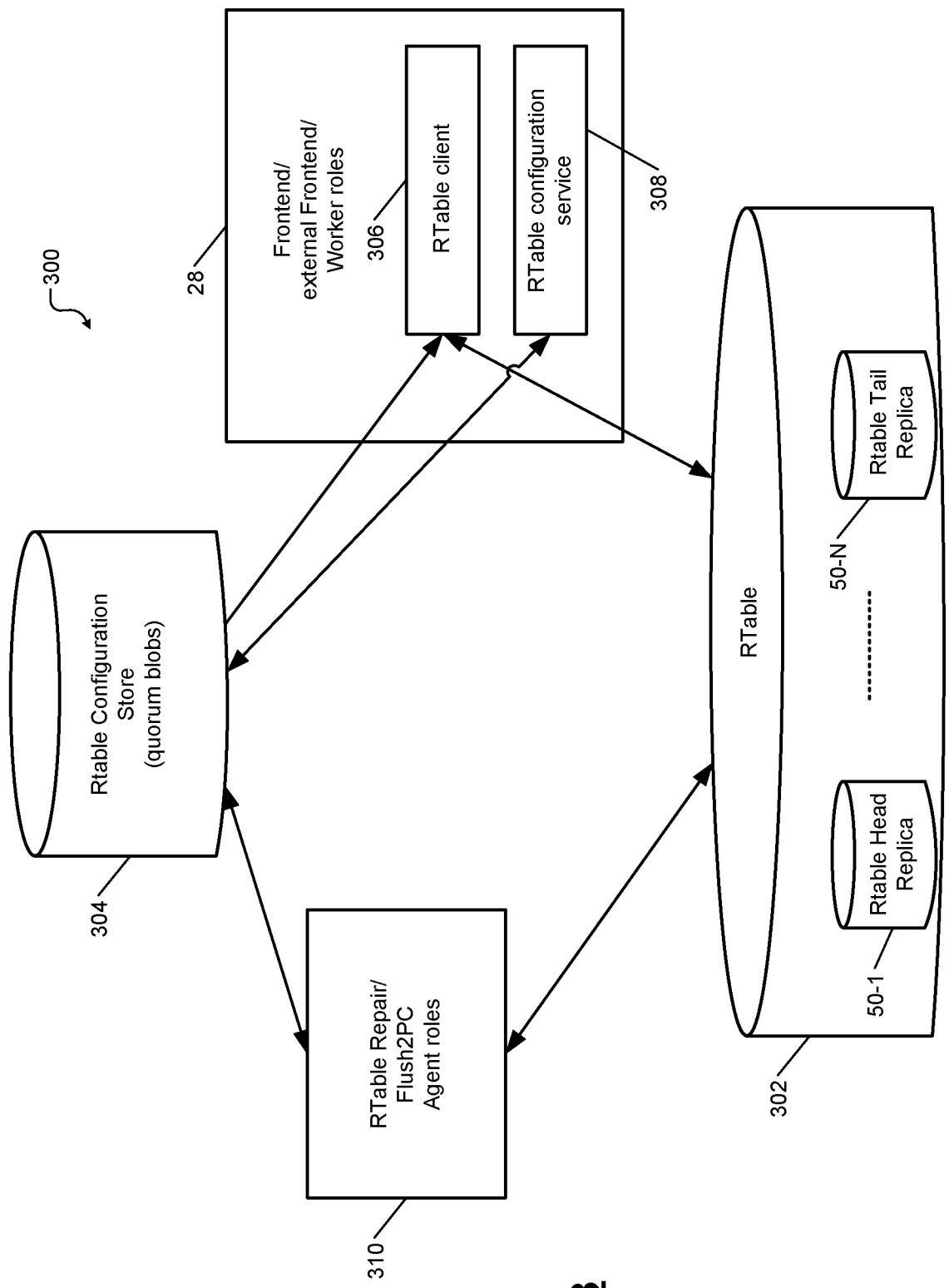
FIG. 13 shows a functional block diagram of a simplified example of a replication table (RTable) system used by the front end of the cloud computing system shown in FIG. 3 to maintain the replicas of the storage account in different data centers.

FIG. 13 shows an RTable system 300 according to the present disclosure. The RTable system 300 uses a synchronized replication table architecture to prevent single storage account failure for the front end 28. The RTable system 300 includes at least two storage accounts (replicas) located in different datacenters, which compose the replication chain. The front end 28 of the cloud computing system 10 (shown in FIG. 3) uses the RTable system 300 that includes two or more replicas of storage accounts to manage the cloud computing system 10. The RTable system 300 differs from the replication system described above in that the RTable system 300 reads data first from the head replica instead of from the tail replica.

As explained below in detail, in the RTable system 300 of the present disclosure, when adding a new replica, an online repair action is triggered by user, and a backend repair service ensures that the new replica has consistent data (referred to as Repair Action). The two phase preparecommit protocol handles concurrent write and read operations of consistent data (referred to as Flush2pc).

FIGS. 13-23 include methods performed by the RTable system 300. In the description of the methods below, the term control refers to one or more of the client and server applications 666 and 686 described below with reference to FIGS. 24-26, which implement all or some aspects of one or more components of the RTable system 300 and one or more methods described below. In other words, the term control as used in the description of the methods below represents code or instructions executed by one or more components of the cloud computing system 10 shown in FIG. 3 to perform the described functionality.

In FIG. 13, in the RTable system 300, an RTable 302 includes at least two storage accounts (replicas) located in different data centers, which compose a replication chain. For example, the RTable 302 includes the head replica 50-1 located in a first data center and the tail replica 50-N located in a second data center.

An RTable configuration store 304, which is similar to the configuration store 152 shown in FIG. 10, maintains the replication chain topology in quorum blobs. The front end 28 includes distributed applications deployed on multiple virtual machines. The applications serve web requests from customers to manage their cloud resources. They also serve admin requests to manage the front end service itself. Each application uses RTable client interface to persist data.

An RTable client 306 reads the RTable replication chain topology from the RTable configuration store 304 to persist data to the replication chain using an RTable protocol. An RTable configuration service 308, which is similar to the configuration agent 156 shown in FIG. 10, is hosted inside each application to make configuration changes in the RTable configuration store 304 for admin purpose, like removing a replica or adding a new replica. Whenever a new replica is added to the RTable chain in the RTable 302, RTable Repair agent roles 310 repair rows in different partition key ranges and tables. After the repair job completes, the new replica has consistent data as any old replicas in chain.

The RTable 302 is built on top of the storage table client library. The front end 28 uses a different (e.g., an ADO.NET) interface to communicate with a storage table. The interfaces between the storage table client library and ADO.NET are totally different. Therefore, the existing RTable interface cannot be utilized by the front end 28 directly.

Figure 14:
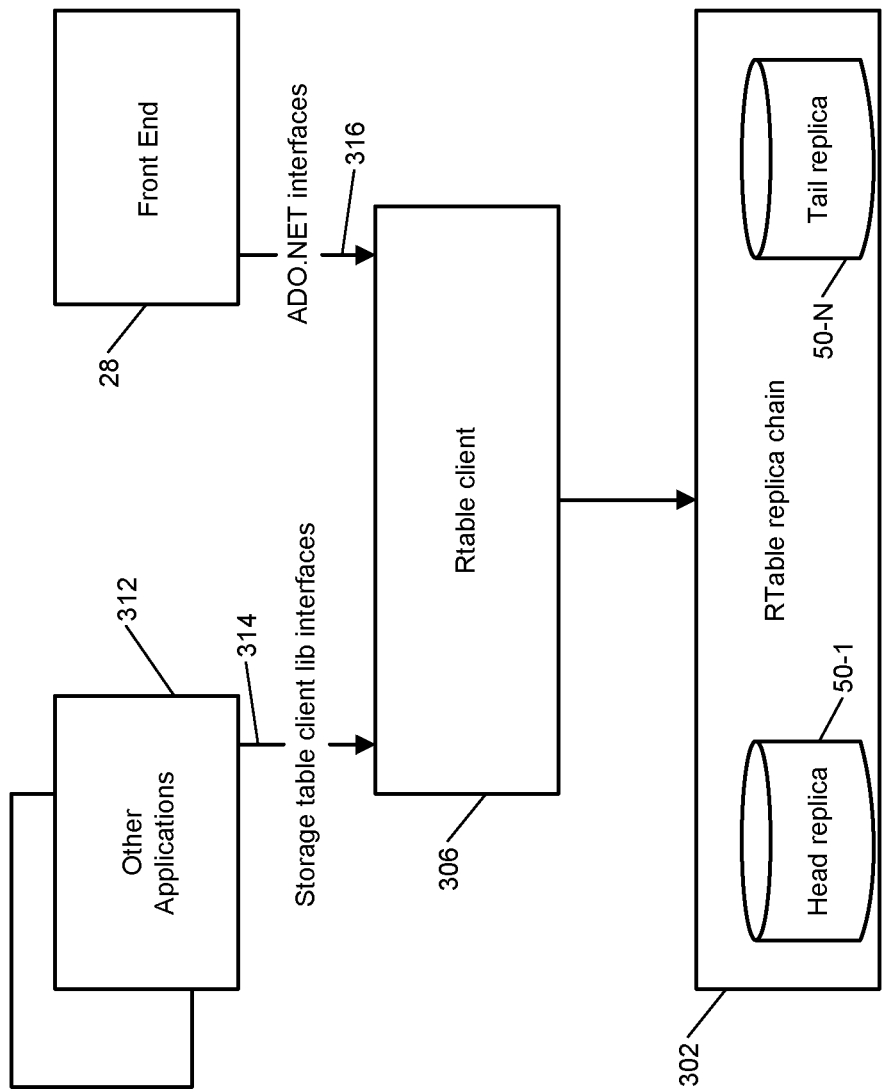
FIG. 14 shows a functional block diagram of a simplified example of an RTable client of the replication table (RTable) system shown in FIG. 13.

FIG. 14 shows a manner of making an RTable client 306 compatible with both storage table client library interface 314 and the ADO.Net interface 316 by providing the RTable client 306 with the ADO.NET interface 316 used by the front end 28 to communicate with the RTable 302, in addition to the storage table client library interfaces 314 currently used by the RTable client 306.

More specifically, an ADO.NET interface 316 used by the front end 28 is exposed from the RTable client 306 as shown. The RTable client 306 can share the logic of Repair Action and Flush2pc with the storage table client library. The front end 28 needs to use the ADO.NET interface 316 to communicate with the storage tables in the RTable 302. Other applications 312 can choose storage table client library interfaces 314 to communicate with the RTable 302. The purpose of provisioning the RTable client 306 with the additional ADO.NET interface 316 is to minimize code changes in the applications 312. This allows the applications 312 to use the same interfaces to communicate with the RTable 302 as what they use to communicate with the storage table directly.

Figure 15:
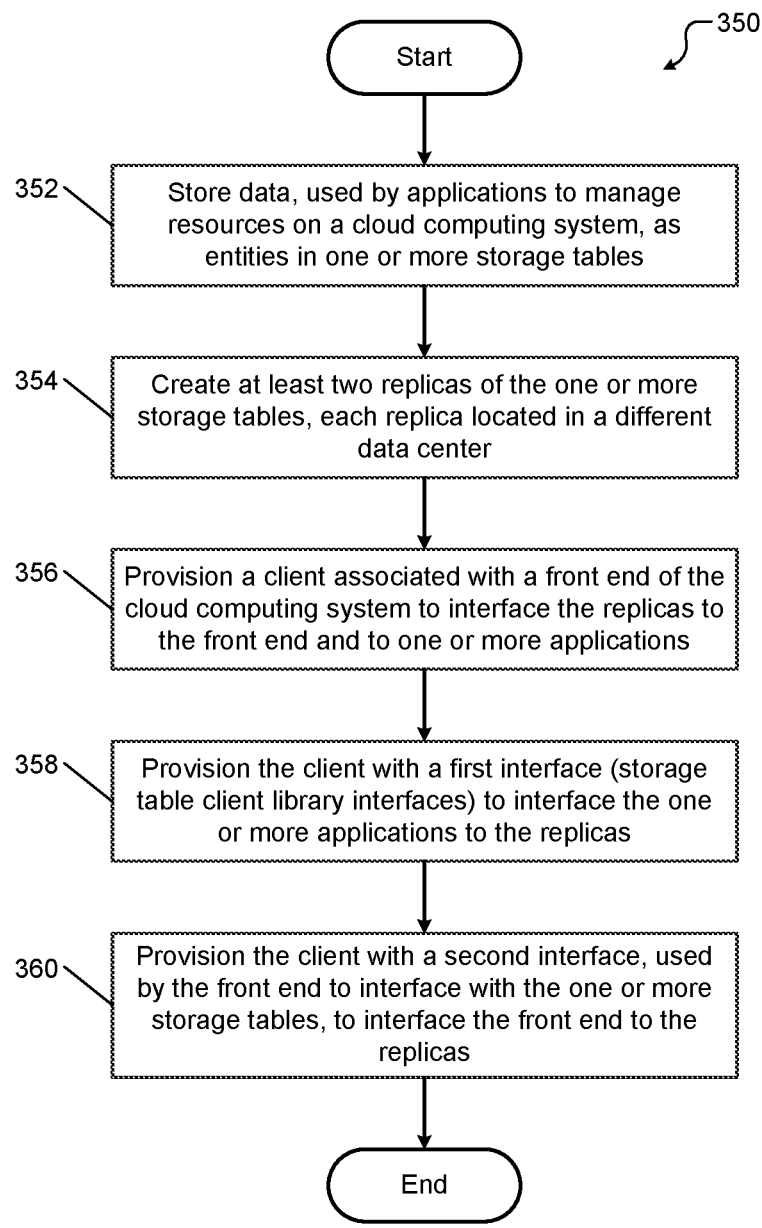
FIG. 15 shows a flowchart of a method for provisioning an RTable client with interfaces that interface the set of replicas to the front end and applications of the cloud computing system shown in FIG. 3.

FIG. 15 shows a method 350 for provisioning an RTable client (e.g., the RTable client 3-6) with the ADO.NET interface 316 used by the front end 28 in addition to the storage table client library interface 314 used by the RTable client 306. At 352, the data used by applications to manage resources on a cloud computing system (e.g., the CCS 10 shown in FIG. 3) is stored as entities in one or more storage tables. At 354, the front-end 28 creates two or more replicas of the storage tables (e.g., the replicas 50 in the RTable 302 shown in FIG. 14), where each replica is located in a different data center. At 356, each client (e.g., the RTable client 306 shown in FIG. 14) associated with the front-end 28 interfaces the replicas 50 to the front-end 28 and to one or more applications (e.g., the applications 312 shown in FIG. 14). At 358, each client 306 is provided with a first interface (e.g., the storage table client library interface 314 shown in FIG. 14) to interface the one or more applications 312 to the replicas 50. At 360, each client 306 is provided with a second interface (e.g., the ADO.NET interface 316 shown in FIG. 14) to interface the front-end 28 to the replicas 50.

If a write operation fails between the head and tail replicas in the RTable 302, read operations will return old data until a next write operation occurs. This is not a normal customer expectation. Therefore, the present disclosure proposes a safety read feature as follows.

FIGS. 16-19 show the safety read feature according to the present disclosure. The safety read feature of the present disclosure involves reading from the head replica 50-1 instead of reading from the tail replica 50-N, to prevent returning old data from the tail replica 50-N if a write operation fails between the head and tail replicas. Specifically, during a read operation, data is first read from the head replica 50-1. If the head replica 50-1 is locked, changes are first pushed from the head replica 50-1 to the tail replica 50-N. Thereafter, the data is returned from the head replica 50-1. If the head replica 50-1 is not locked, data is returned from the head replica 50-1.

Figure 16:
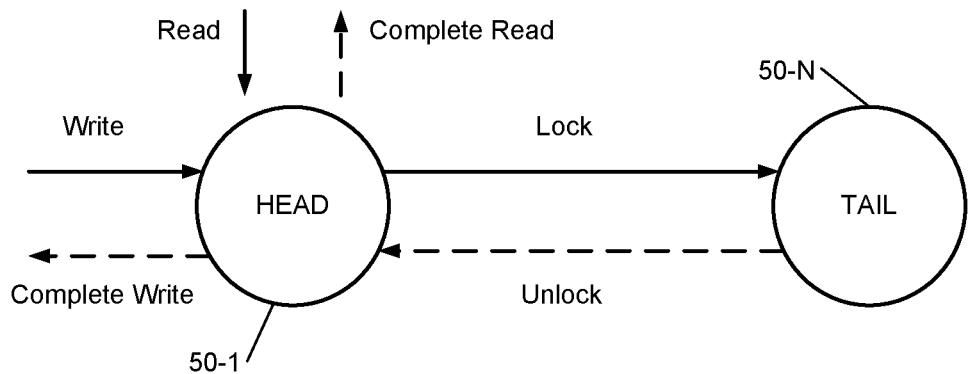
FIG. 16 shows read/write procedure performed on the replicas.

In FIG. 16, during a safety read operation, data is read first from the head replica 50-1 in the RTable 302; if the head replica 50-1 is locked, the Flush2pc operation is performed to push changes in the head replica 50-1 to the tail replica 50-N first; and then the data is returned from the head replica 50-1. Otherwise, if the head replica 50-1 is not locked, the read operation simply returns the data from the head replica 50-1. This should not increase the latency of the read operation, because such a Flush2pc operation is performed only when a previous write operation fails between the head replica 50-1 and the tail replica 50-N.

Also, when a new replica is added to the replica chain in the RTable 302, the new replica is added to the tail (i.e., at the end of the chain or as a tail replica) to reduce the read latency. The repair agent 310 sets up the new replica to have consistent data as the head replica 50-1. After that, the replica chain in the RTable 302 is stable again, and there is no single point of failure.

Figure 17:
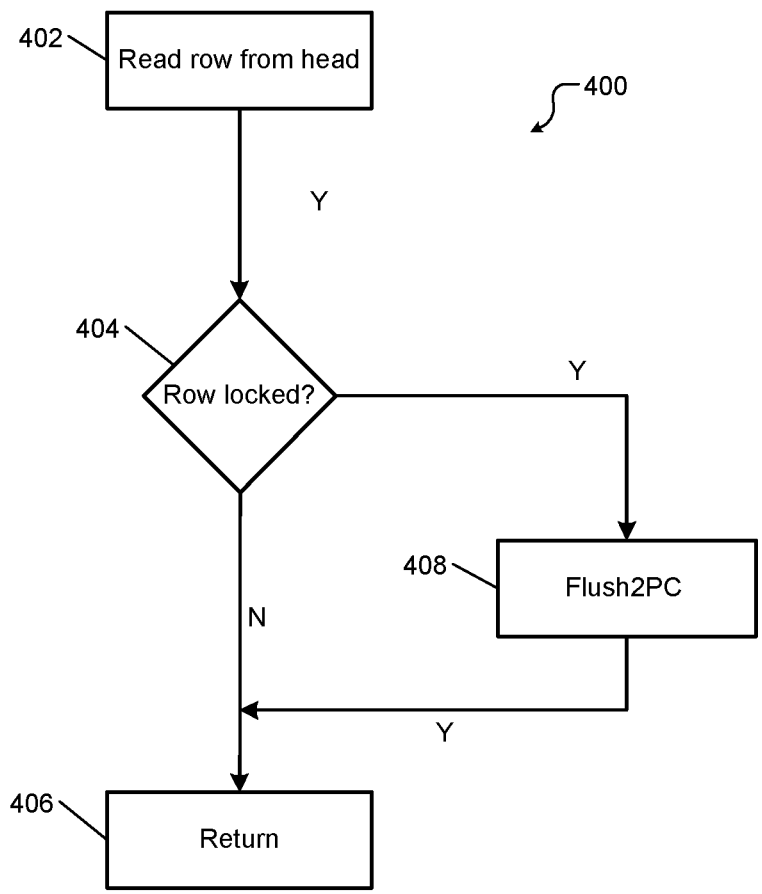
FIG. 17 shows a flowchart of a get protocol used to read data from the replicas.

FIG. 17 shows a get protocol 400 used by the safety read feature. At 402, the get protocol 400 reads a row from the head replica (e.g., the head replica 50-1 shown in FIG. 16). At 404, the get protocol 400 checks if the row is locked. At 406, if the row is not locked, the get protocol 400 returns the data read from the row from the head replica (e.g., the head replica 50-1 shown in FIG. 16). At 408, if the row is locked, the Flush2PC operation is performed, and thereafter the get protocol 400 returns the data read from the row from the head replica.

Figure 18:
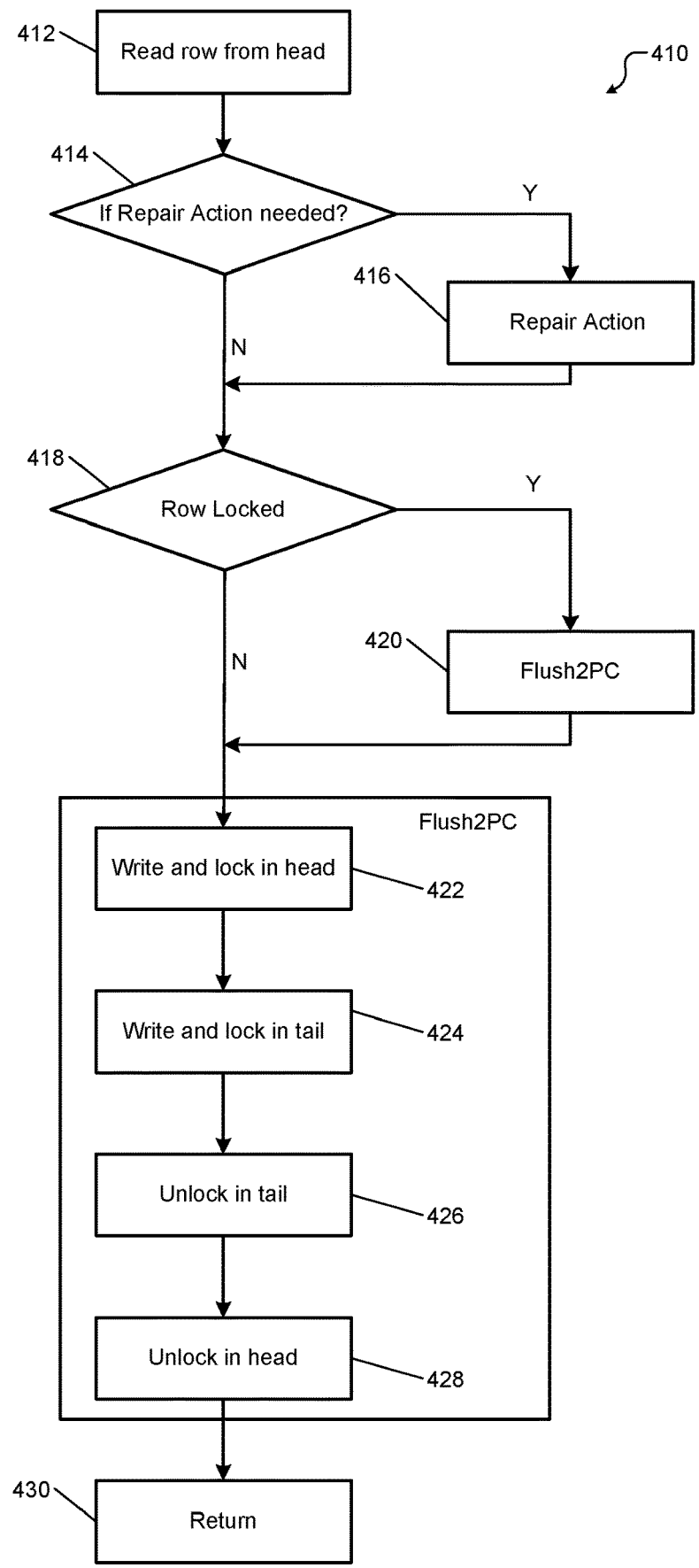
FIG. 18 shows a flowchart of a write protocol used to write data to the replicas.

FIG. 18 shows a write protocol 410 used by the safety read feature. At 412, the write protocol 410 reads a row from the head replica (e.g., the head replica 50-1 shown in FIG. 16). At 414, the write protocol 410 determines if a repair action is needed. At 416, if a repair action is needed, the write protocol 410 performs the repair action. Thereafter or if a repair action is not needed, at 418, the write protocol 410 determines if the row is locked. At 420, if the row is locked, the write protocol 410 performs the Flush2PC operation. Thereafter or if the row is not locked, at 422, the write protocol 410 writes and locks the head replica (e.g., the head replica 50-1 shown in FIG. 16). At 424, the write protocol 410 writes and locks the tail replica (e.g., the tail replica 50-N shown in FIG. 16). At 426, the write protocol 410 unlocks the tail replica. At 428, the write protocol 410 unlocks the head replica. Operations 422 through 428 constitute the Flush2PC operation. At 430, the write protocol 410 returns the data read from the row from the head replica.

Figure 19:
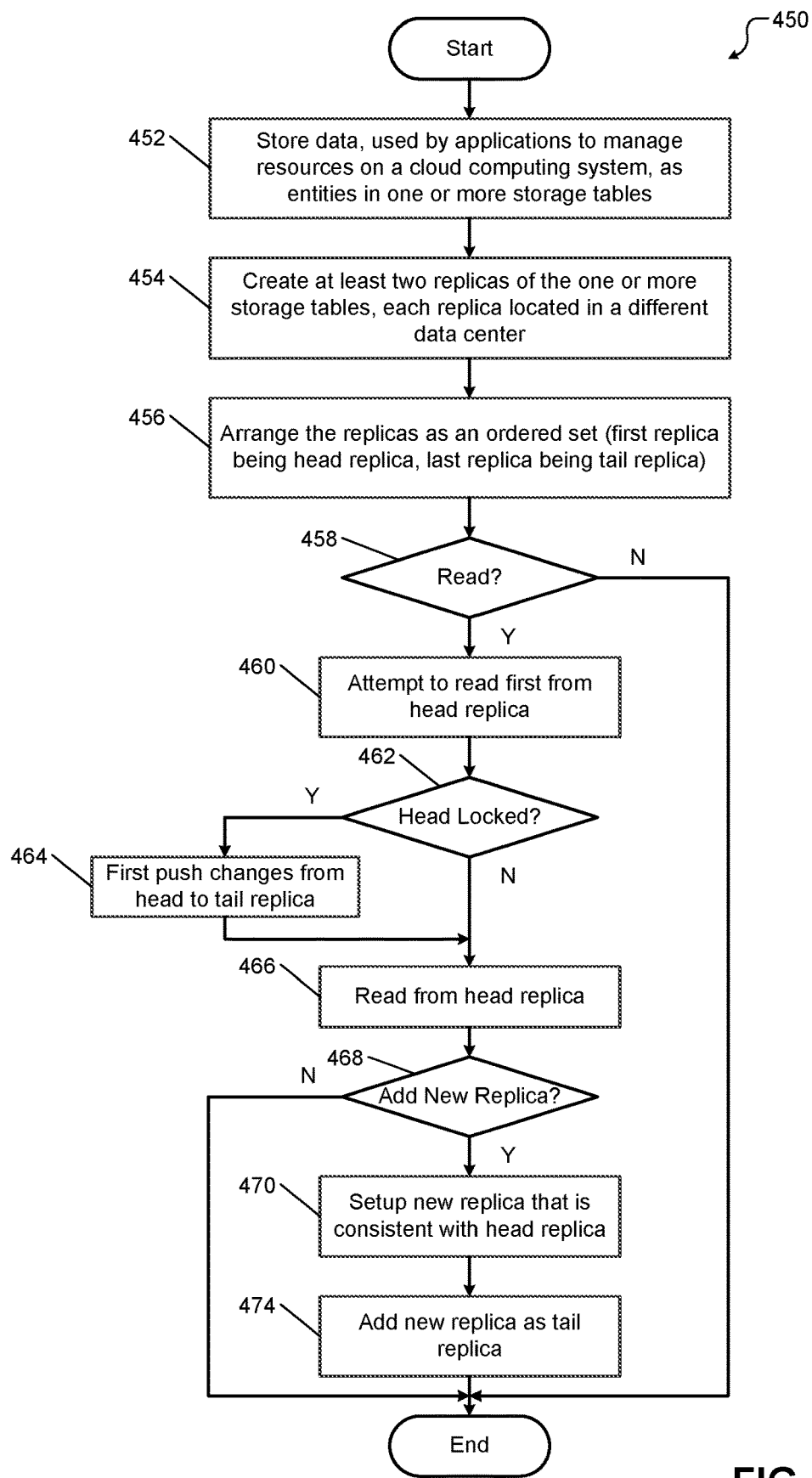
FIG. 19 shows a flowchart of a method for performing a read operation by reading data first from the head replica.

FIG. 19 shows a method 450 for performing a safety read operation by reading data from the head replica 50-1 according to the present disclosure. At 452, control stores data used by applications to manage resources on a cloud computing system as entities in one or more storage tables. At 454, control creates at least two replicas of the storage tables, where each replica is located in a different data center. At 456, control arranges the replicas as an ordered set, where the first replica in the ordered set is the head replica, and the last replica in the ordered set is the tail replica.

At 458, control checks if a read operation is to be performed. At 460, if a read operation is to be performed, control attempts to read first from the head replica. At 462, control checks if the head replica is locked. At 464, if the head replica is locked, control first pushes the changes from the head replica to the tail replica. Thereafter or if the head replica is not locked, at 466, control reads from the head replica.

At 468, control determines whether to add a new replica. At 470, if a new replica is to be added, control sets up a new replica that is consistent with the head replica. At 474, control adds the new replica as tail replica at the end of the chain of the replicas.

Figure 20:
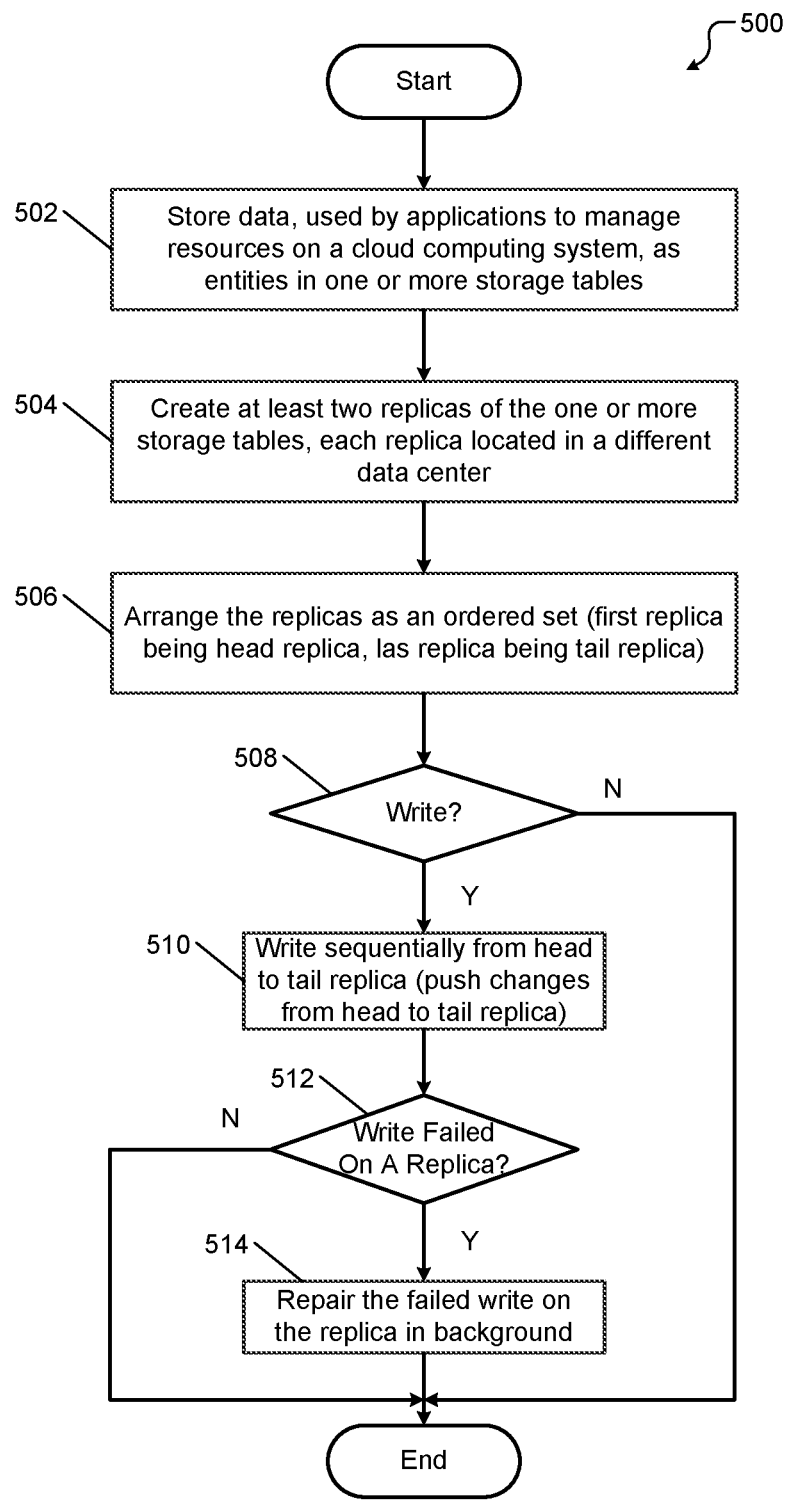
FIG. 20 shows a flowchart of a method for performing a repair operation in the background.

FIG. 20 shows a method 500 for performing a repair operation in the backend to improve write latency according to the present disclosure. Specifically, in case of a failure between the head and tail replicas, a repair action is typically triggered only by a next write operation, which increases the end-to-end time of a write operation. Therefore, the present disclosure proposes a separate repair service. Whenever a failure occurs in the middle of a Flush2pc operation (i.e., when a write operation fails in the middle of pushing changes from the head replica 50-1 to the tail replica 50-N), an event is placed in a storage queue. The event placed in the storage queue triggers a repair service that pop ups from the storage queue to perform the Flush2pc operation (i.e., to push changes from the head replica 50-1 to the tail replica 50-N) for the failed write operation. The Flush2pc operation (i.e., pushing changes from the head replica 50-1 to the tail replica 50-N) is performed in backend and therefore does not increase the latency of a next write operation.

In the method 500, at 502, control stores data used by applications to manage resources on a cloud computing system as entities in one or more storage tables. At 504, control creates at least two replicas of the storage tables, where each replica is located in a different data center. At 506, control arranges the replicas as an ordered set, where the first replica in the ordered set is her head replica, and the last replica in the ordered set is the tail replica.

At 508, control checks if a write operation is to be performed. At 510, if a write operation is to be performed, control writes sequentially from the head replica to the tail replica (i.e., pushes the changes in the head replica from the head replica to the tail replica). At 512, control determines if the write operation failed in a replica between the head replica and the tail replica. At 514, if the write operation failed in a replica between the head replica and the tail replica, control repairs the failed write operation on the replica in background.

Figure 23:
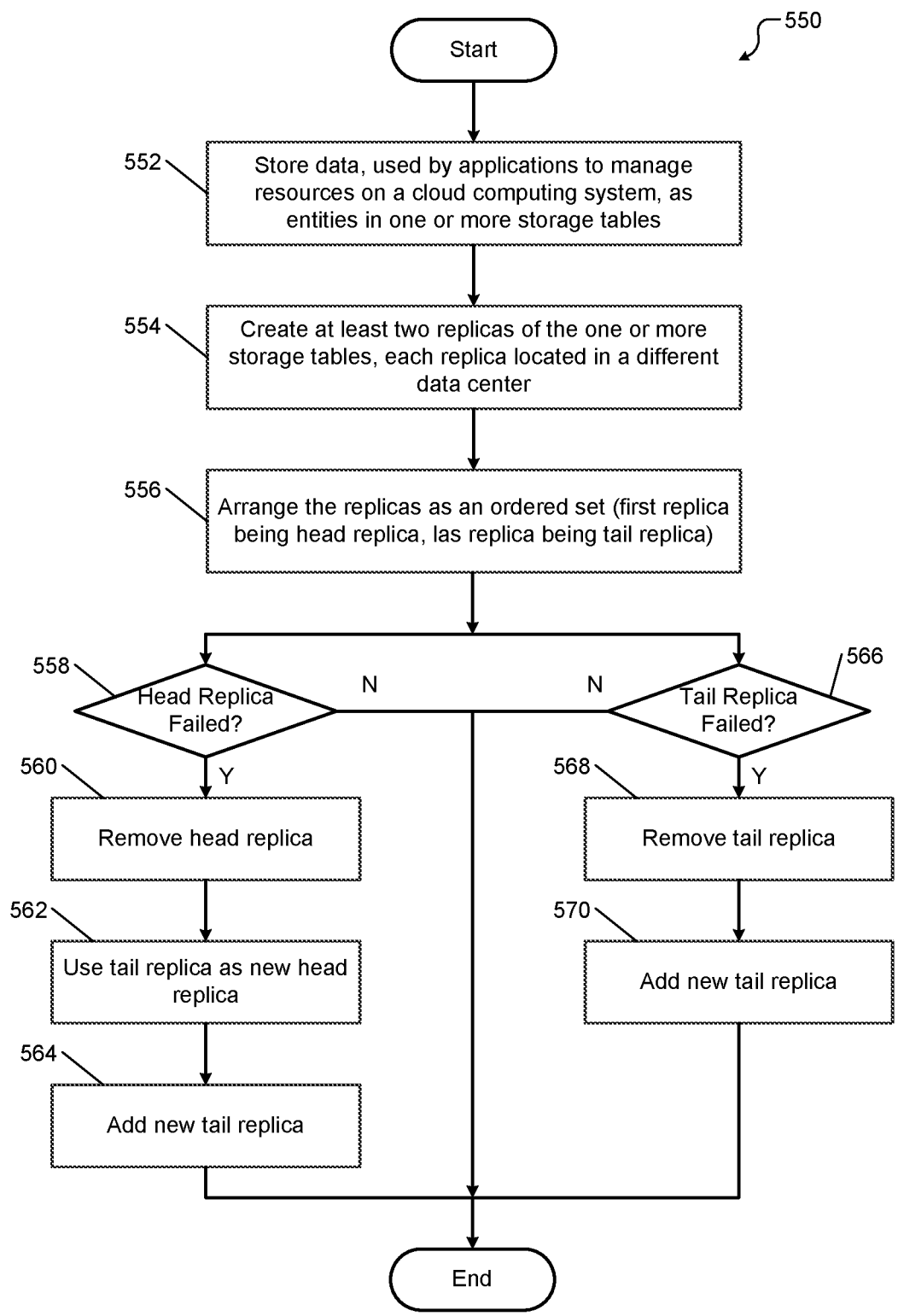
FIG. 23 shows a flowchart of a method for reading from the head replica.

FIGS. 21-23 show the availability model of the RTable 302. In FIG. 21, while the front end 28 can recover from a single storage account outage with zero recovery point objective (RPO) if a read operation is performed on the tail replica 50-N, the following scenarios can occur. If the head replica 50-1 is down, while the read operation still survives, the write operation will be down. To recover, the head storage account (i.e., the head replica 50-1) is removed from the chain of replicas in the RTable 302, and a new head replica is added later. If the tail replica 50-N is down, both read and write operations will be down. To recover, the tail storage account (i.e., the tail replica 50-N) is removed from the chain of replicas in the RTable 302, and the existing head storage account (i.e., the head replica 50-1) changes the role to become the new tail replica 50-N; and a new head replica is added later.

In FIG. 22, according to the present disclosure, the read operation is performed on the head replica 50-1 instead of on the tail replica 50-N. The front end 28 can recover from a single storage account outage with zero recovery point objective (RPO). In addition, if the head replica 50-1 is down, the read operation still survives while the write operation will be down. To recover, the head storage account (i.e., the head replica 50-1) is removed from the chain of replicas in the RTable 302. The existing tail storage account (i.e., the tail replica 50-N) changes the role to become the new head replica 50-1; and a new tail replica is added later. If the tail replica 50-N is down, the read operation still survives while the write operation will be down. To recover, the tail storage account (i.e., the tail replica 50-N) is removed from the chain of replicas in the RTable 302; and a new tail replica is added later.

FIG. 23 shows a method 550 for reading from the head replica instead of reading from the tail replica so that a read operation survives even if the tail replica fails. At 552, control stores data used by applications to manage resources on a cloud computing system as entities in one or more storage tables. At 554, control creates at least two replicas of the storage tables, where each replica is located in a different data center. At 556, control arranges the replicas as an ordered set, where the first replica in the ordered set is her head replica, and the last replica in the ordered set is the tail replica.

At 558, control determines if the head replica failed. At 560, if the head replica failed, control removes the head replica from the chain of replicas. At 562, control uses (i.e., reconfigures or changes the role of) the tail replica as the new head replica. At 564, control adds a new tail replica at the end of the chain of replicas.

At 566, control determines if the tail replica failed. At 568, if the tail replica failed, control removes the tail replica from the chain of replicas. At 570, control adds a new tail replica at the end of the chain of replicas.

Below are simplistic examples of a distributed computing environment in which the systems and methods of the present disclosure described above can be implemented. Throughout the present disclosure, references to terms such as servers, client devices, applications, and so on are for illustrative purposes only. The terms servers and client devices are to be understood broadly as representing computing devices comprising one or more processors and memory configured to execute machine readable instructions. The terms applications and computer programs are to be understood broadly as representing machine readable instructions executable by the computing devices.

Figure 24:
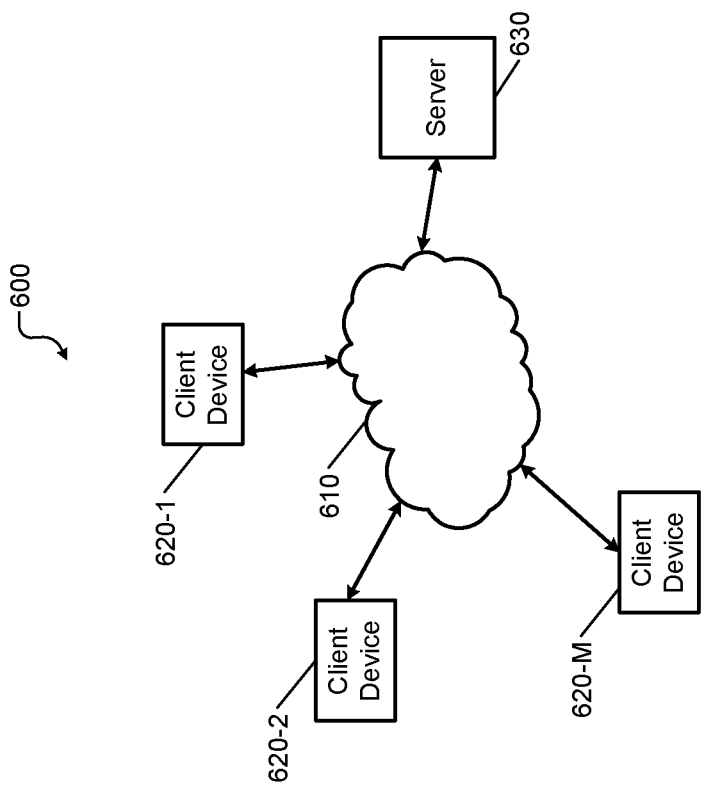
FIG. 24 is a functional block diagram of a simplified example of a distributed network system.

FIG. 24 shows a simplified example of a distributed network system 600. The distributed network system 600 includes a network 610, one or more client devices 620-1, 620-2, . . . , and 620-N (collectively client devices 620) (where N is an integer greater than or equal to one), and a server 630. The network 610 may include a local area network (LAN), a wide area network (WAN) such as the Internet, or other type of network (collectively shown as the network 610). While only one server is shown, the distributed network system 300 may include multiple servers. The client devices 620 communicate with the server 630 via the network 610. The client devices 620 and the server 630 may connect to the network 610 using wireless and/or wired connections to the network 610.

One or more servers 630 and the client devices 620 may implement one or more components of the cloud computing system 10 shown in FIG. 3. For example, one server 630 may implement the cloud controller 12 of the cloud controller 12 while one or more client devices 620 may implement the fabric controllers 32. Alternatively, one or more servers 630 may implement one or more components of the cloud controller 12 (e.g., the front end 28). Many different configurations of implementations are contemplated.

The server 630 may provide multiple services to the client devices 620. For example, the server 630 may execute a plurality of software applications. The server 630 may host multiple databases that are utilized by the plurality of software applications and that are used by the client devices 620. In addition, the server 630 and the client devices 620 may execute applications that implement one or more components of the RTable system 300 and one or more methods used by the RTable system 300 described above.

Figure 25:
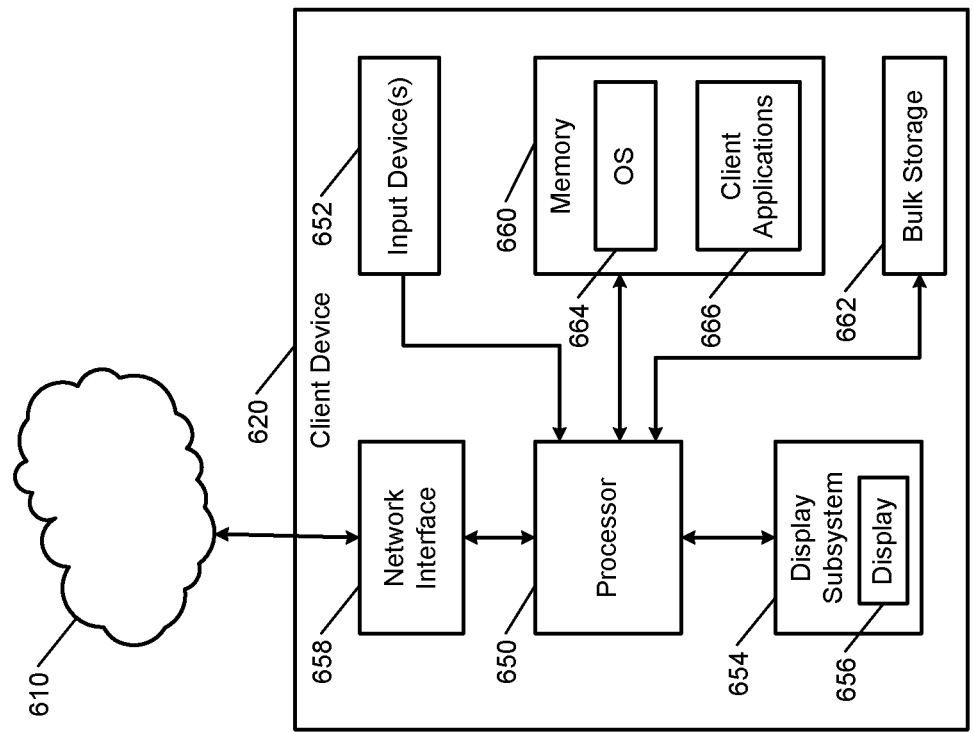
FIG. 25 is a functional block diagram of a simplified example of a client device used in the distributed network system of FIG. 24.

FIG. 25 shows a simplified example of the client device 620. The client device 620 may typically include a central processing unit (CPU) or processor 650, one or more input devices 652 (e.g., a keypad, touchpad, mouse, and so on), a display subsystem 654 including a display 656, a network interface 658, a memory 660, and a bulk storage 662.

The network interface 658 connects the client device 620 to the distributed network system 600 via the network 610. For example, the network interface 658 may include a wired interface (e.g., an Ethernet interface) and/or a wireless interface (e.g., a Wi-Fi, Bluetooth, near field communication (NFC), or other wireless interface). The memory 660 may include volatile or nonvolatile memory, cache, or other type of memory. The bulk storage 662 may include flash memory, a hard disk drive (HDD), or other bulk storage device.

The processor 650 of the client device 620 executes an operating system (OS) 364 and one or more client applications 666. The client applications 666 include an application to connect the client device 620 to the server 630 via the network 610. The client device 620 accesses one or more applications executed by the server 630 via the network 610. The client applications 666 may also include an application that implements all or some aspects of one or more components of the RTable system 300 and one or more methods used by the RTable system 300 described above.

Figure 26:
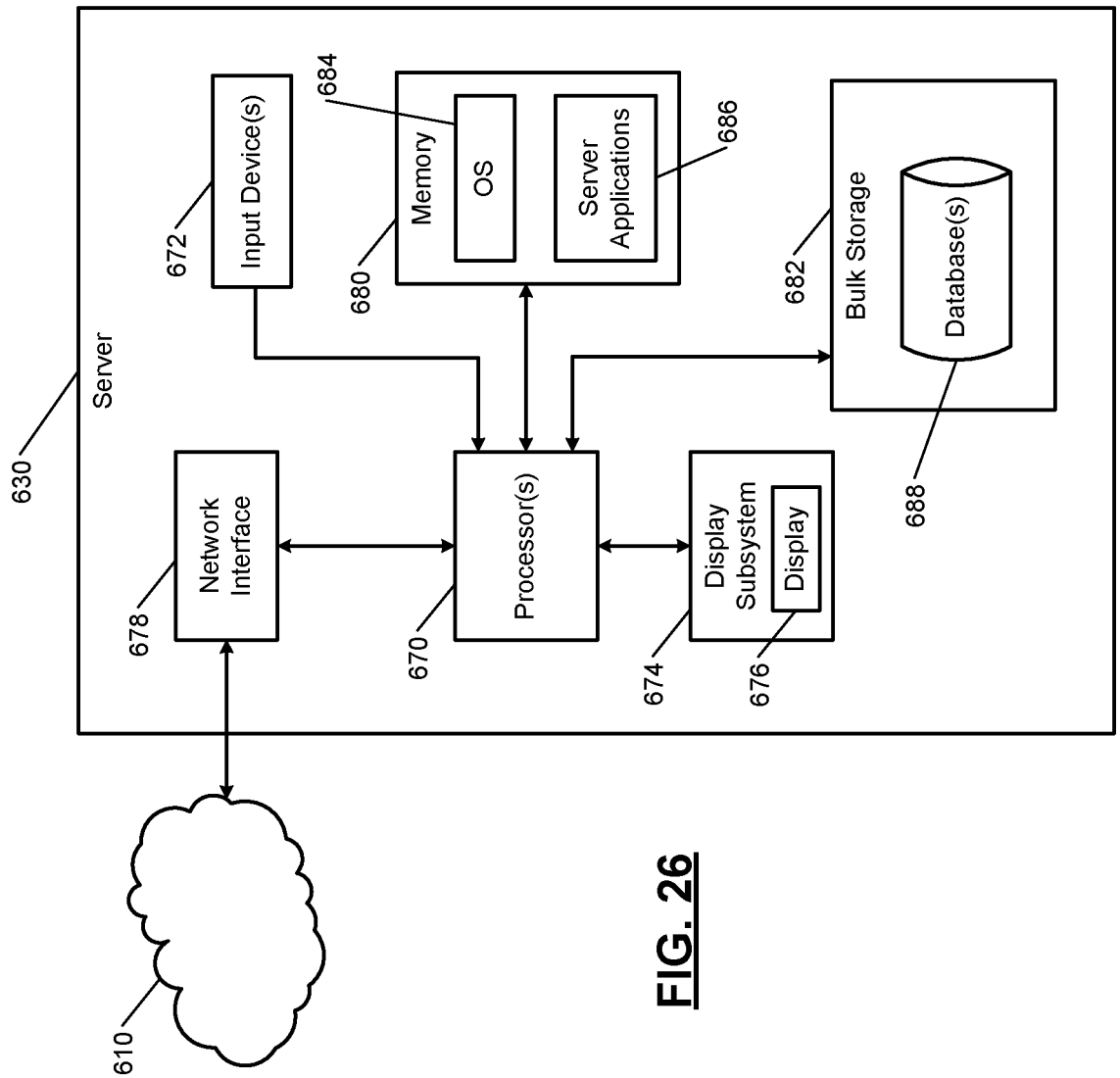
FIG. 26 is a functional block diagram of a simplified example of a server used in the distributed network system of FIG. 24.

FIG. 26 shows a simplified example of the server 630. The server 630 typically includes one or more CPUs or processors 670, one or more input devices 672 (e.g., a keypad, touchpad, mouse, and so on), a display subsystem 674 including a display 676, a network interface 678, a memory 680, and a bulk storage 682.

The network interface 678 connects the server 630 to the distributed network system 600 via the network 610. For example, the network interface 678 may include a wired interface (e.g., an Ethernet interface) and/or a wireless interface (e.g., a Wi-Fi, Bluetooth, near field communication (NFC), or other wireless interface). The memory 680 may include volatile or nonvolatile memory, cache, or other type of memory. The bulk storage 682 may include flash memory, one or more hard disk drives (HDDs), or other bulk storage device.

The processor 670 of the server 630 executes an operating system (OS) 384 and one or more server applications 686. The server applications 686 may include an application that implements all or some aspects of one or more components of the RTable system 300 and one or more methods used by the RTable system 300 described above. The bulk storage 682 may store one or more databases 688 that store data structures used by the server applications 686 to perform respective functions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory is a subset of the term computer-readable medium or machine-readable medium. The term computer-readable medium or machine-readable medium, as used herein, does not encompass transitory electrical or electromagnetic signals propagating through a medium (such as on a carrier wave); the term computer-readable medium or machine-readable medium may therefore be considered tangible and non-transitory. Non-limiting examples of a non-transitory, tangible computer-readable medium or machine-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a processor and memory; and
machine readable instructions stored in the memory, when executed by the processor, configure the processor to:
store data as entities in one or more tables, the one or more tables being associated with a plurality of replicas of the one or more tables, the plurality of replicas including an ordered sequence of replicas from a first replica to a last replica, the plurality of replicas having read views and write views;
perform a write operation to an entity in the one or more tables based on the ordered sequence of replicas, wherein performing the write operation comprises:

determining whether the read views match corresponding write views for the plurality of replicas;
sequentially locking the plurality of replicas from the first replica to the last replica based on whether the read views match corresponding write views, wherein sequentially locking the plurality of replicas comprises sequentially setting a lock bit for each replica of the plurality of replicas from the first replica to the last replica;
sequentially unlocking and committing data to the plurality of replicas from the last replica to the first replica, wherein sequentially unlocking and committing data comprises reversing the lock bit and committing the data for each replica of the plurality of replicas in reverse order from the last replica to the first replica; and
confirm success of the write operation based on receiving an indication of completing the write operation sequentially from the last replica to the first replica.

2. The system of claim 1 wherein the data includes structured and non-relational data.

3. The system of claim 1 wherein the machine readable instructions further configure the processor to store each replica from the plurality of replicas in a different data center to secure the data when one of the data centers fails.

4. The system of claim 1 wherein the machine readable instructions further configure the processor to:
perform a read operation by reading from the last replica based on a determination that one or more replicas from the plurality of replicas are locked while performing the write operation.

5. The system of claim 1, wherein the machine readable instructions further configure the processor to generate a new replica and add the new replica to the plurality of replicas subsequent to the last replica such that the new replica becomes a new last replica.

6. The system of claim 1, wherein the machine readable instructions further configure the processor to generate a new replica including data that is consistent with the first replica, to generate the new replica in background, and to add the new replica to the plurality of replicas subsequent to the last replica such that the new replica becomes a new last replica.

7. The system of claim 1 wherein the machine readable instructions further configure the processor to:
generate the ordered sequence of the plurality of replicas of the one or more tables; and
when a replica in the ordered sequence fails:
remove the replica from the plurality of replicas,
use the last replica in the ordered sequence in place of the removed replica, and
add a new last replica to the sequence of the plurality of replicas.

8. The system of claim 1 wherein the machine readable instructions further configure the processor to:
generate the ordered sequence of the plurality of replicas of the one or more tables; and
when the last replica in the ordered sequence fails:
remove the last replica from the plurality of replicas, and
add a new last replica in place of the removed last replica.

9. A method comprising:
storing data as entities in one or more tables, the one or more tables being associated with a plurality of replicas of the one or more tables, the plurality of replicas including an ordered sequence of replicas from a first replica to a last replica, the plurality of replicas having read views and write views;
performing a write operation to an entity in the one or more tables based on the ordered sequence of replicas, wherein performing the write operation comprises:
determining whether the read views match corresponding write views for the plurality of replicas;
sequentially locking the plurality of replicas in forward order from the first replica to the last replica based on whether the read views match corresponding write views; and
sequentially unlocking and committing data to the plurality of replicas in reverse order from the last replica to the first replica;
confirming success of the write operation based on receiving an indication of completing the write operation sequentially in reverse order from the last replica to the first replica; and
performing a read operation by reading from the last replica based on a determination that one or more replicas from the plurality of replicas are locked while performing the write operation.

10. The method of claim 9 further comprising storing each replica from the plurality of replicas in a different data center to secure the data when one of the data centers fails.

11. The method of claim 9 further comprising:
generating a new replica; and
adding the new replica to the plurality of replicas subsequent to the last replica such that the new replica becomes a new last replica.

12. The method of claim 11, wherein generating the new replica is performed as a background process.

13. The method of claim 9 further comprising:
generating the ordered sequence of the plurality of replicas of the one or more tables;
performing a write operation by writing sequentially from a first replica to a last replica in the ordered sequence; and
when the write operation fails on one of the replicas between the first and the last replicas, performing a repair operation on the one of the replica in background.

14. The method of claim 13 further comprising performing the repair operation on the one of the replica in background by:
adding an event in a storage queue when the write operation fails on the one of the replicas between the first and the last replicas; and
activating a repair service that performs the repair operation in the background.

15. The method of claim 9 further comprising:
generating the ordered sequence of the plurality of replicas of the one or more tables; and
when a replica in the ordered sequence fails:
removing the replica from the plurality of replicas,
using the last replica in the ordered set in place of the remoted replica, and
adding a new last replica to the sequence of the plurality of replicas.

16. The method of claim 9 further comprising:
generating the ordered sequence of the plurality of replicas of the one or more tables; and
when the last replica in the ordered sequence fails:
removing the last replica from the plurality of replicas, and adding a new last replica in place of the removed last replica.

17. A system comprising:

a processor and memory; and machine readable instructions stored in the memory, when executed by the processor, configure the processor to:

store data as entities in one or more tables, the one or more tables being associated with a plurality of replicas of the one or more tables, the plurality of replicas including an ordered sequence of replicas from a first replica to a last replica, the plurality of replicas having read views and write views;

perform a write operation to an entity in the one or more tables based on the ordered sequence of replicas, wherein performing the write operation comprises:

determining whether the read views match corresponding write views for the plurality of replicas;

sequentially locking the plurality of replicas in forward order from the first replica to the last replica in the ordered sequence based on whether the read views match corresponding write views; and sequentially unlocking and committing data to the plurality of replicas in reverse order from the last replica to the first replica;

confirm success of the write operation based on receiving an indication of completing the write operation sequentially from the last replica to the first replica; and perform a read operation by reading from the last replica based on a determination that one or more replicas from the plurality of replicas are locked while performing the write operation.

* * * * *